(12) United States Patent
Chien

(10) Patent No.: US 9,097,413 B2
(45) Date of Patent: Aug. 4, 2015

(54) LED NIGHTLIGHT SYSTEM HAVING AN IMAGE PROJECTION FEATURE

(71) Applicant: Tseng-Lu Chien, Taipei (TW)

(72) Inventor: Tseng-Lu Chien, Taipei (TW)

( * ) Notice: Subject to any disclaimer, the term of this patent is extended or adjusted under 35 U.S.C. 154(b) by 0 days.

(21) Appl. No.: 14/622,628

(22) Filed: Feb. 13, 2015

(65) Prior Publication Data

US 2015/0159843 A1    Jun. 11, 2015

Related U.S. Application Data

(60) Continuation-in-part of application No. 12/834,435, filed on Jul. 12, 2010, which is a division of application No. 12/292,153, filed on Nov. 12, 2008, now Pat. No. 7,871,192.

(51) Int. Cl.
| | |
|---|---|
| *H01R 33/00* | (2006.01) |
| *F21V 23/00* | (2015.01) |
| *F21S 4/00* | (2006.01) |
| *F21S 9/02* | (2006.01) |
| *F21V 21/08* | (2006.01) |
| *F21V 21/14* | (2006.01) |

(Continued)

(52) U.S. Cl.
CPC ............... *F21V 23/00* (2013.01); *F21S 4/008* (2013.01); *F21S 8/035* (2013.01); *F21S 9/02* (2013.01); *F21S 10/007* (2013.01); *F21V 5/04* (2013.01); *F21V 14/003* (2013.01); *F21V 14/006* (2013.01); *F21V 17/02* (2013.01); *F21V 21/08* (2013.01); *F21V 21/14* (2013.01); *F21V 33/0052* (2013.01); *G02F 1/1313* (2013.01); *G03B 21/142* (2013.01); *G03B 21/2046* (2013.01); *G03B 23/00* (2013.01); *F21V 21/22* (2013.01); *F21V 21/30* (2013.01); *F21V 23/0442* (2013.01); *F21V 23/0471* (2013.01); *F21W 2121/00* (2013.01); *F21Y 2101/02* (2013.01); *Y10S 362/80* (2013.01)

(58) Field of Classification Search
CPC ........................................................ F21S 8/035
USPC .......................................................... 362/641
See application file for complete search history.

(56) References Cited

U.S. PATENT DOCUMENTS

| 4,285,028 A | 8/1981 | Sundin et al. | |
|---|---|---|---|
| 5,321,449 A * | 6/1994 | Coccoli et al. | 353/43 |

(Continued)

FOREIGN PATENT DOCUMENTS

EP          1411290 A1      4/2004

OTHER PUBLICATIONS https://partysuppliesandtoys.wordpress.com/2008/07/18/blacklight-360-the-multi-function-wireless-black-light/, posted on Jul. 18, 2008.

(Continued)

*Primary Examiner* — Sean Gramling
(74) *Attorney, Agent, or Firm* — Robert Crownover

(57) ABSTRACT

A light emitting diode night light system can include: a tube housing; a light emitting diode positioned at one end of the tube housing, the light emitting diode for providing a visible light beam; a lens positioned at a different end of the tube housing from the light emitting diode; and an optical component positioned within the tube housing, the optical component positioned between the light emitting diode and the lens, and the optical component arranged perpendicularly to the visible light beam and configured to create an image from the visible light beam.

16 Claims, 20 Drawing Sheets

(51) Int. Cl.

| | |
|---|---|
| *F21S 8/00* | (2006.01) |
| *F21V 17/02* | (2006.01) |
| *F21V 33/00* | (2006.01) |
| *G02F 1/13* | (2006.01) |
| *G03B 21/14* | (2006.01) |
| *G03B 21/20* | (2006.01) |
| *G03B 23/00* | (2006.01) |
| *F21V 14/00* | (2006.01) |
| *F21S 10/00* | (2006.01) |
| *F21V 5/04* | (2006.01) |
| *F21V 21/22* | (2006.01) |
| *F21V 21/30* | (2006.01) |
| *F21V 23/04* | (2006.01) |
| *F21Y 101/02* | (2006.01) |
| *F21W 121/00* | (2006.01) |

(56) References Cited

U.S. PATENT DOCUMENTS

| | | | |
|---|---|---|---|
| 5,324,224 A | 6/1994 | Anderson et al. | |
| 5,517,264 A | 5/1996 | Sutton | |
| 5,595,435 A | 1/1997 | Palmer et al. | |
| 5,667,736 A | 9/1997 | Chien | |
| 5,683,161 A | 11/1997 | Ishikawa et al. | |
| 5,738,540 A | 4/1998 | Hetherington | |
| 5,743,613 A | 4/1998 | Jeong | |
| 5,752,766 A | 5/1998 | Bailey et al. | |
| 5,934,223 A | 8/1999 | Ellery-Guy | |
| 6,183,115 B1 | 2/2001 | Durando | |
| 6,431,719 B1 * | 8/2002 | Lau et al. | 362/95 |
| 6,558,022 B2 | 5/2003 | Kawahara | |
| 6,744,693 B2 | 6/2004 | Brockmann et al. | |
| 6,824,296 B2 | 11/2004 | Souza et al. | |
| 6,883,918 B2 | 4/2005 | Yaniv | |
| 7,182,472 B2 | 2/2007 | Vitantonio et al. | |
| D541,922 S | 5/2007 | Wefler et al. | |
| D542,400 S | 5/2007 | Wefler | |
| 7,232,251 B2 | 6/2007 | Chien | |
| D546,931 S | 7/2007 | Wefler | |
| 7,264,377 B2 | 9/2007 | Cooper et al. | |
| 7,264,534 B2 | 9/2007 | Stubenfoll | |
| 7,267,444 B2 | 9/2007 | Black, Jr. | |
| 7,281,811 B2 | 10/2007 | Thuot Rann et al. | |
| 7,329,035 B2 | 2/2008 | Feliciano | |
| 7,357,520 B2 | 4/2008 | Vitantonio et al. | |
| 7,431,465 B2 | 10/2008 | Ozaki et al. | |
| 7,438,446 B1 | 10/2008 | McCann | |
| 7,455,444 B2 | 11/2008 | Chien | |
| 7,478,912 B2 | 1/2009 | Black, Jr. | |
| 7,568,829 B2 | 8/2009 | Chien | |
| 7,611,253 B2 | 11/2009 | Chien | |
| 7,618,150 B2 | 11/2009 | Chien | |
| 7,632,004 B2 | 12/2009 | Chien | |
| 7,717,570 B2 | 5/2010 | Black, Jr. | |
| 7,726,839 B2 | 6/2010 | Chien | |
| 7,726,841 B2 | 6/2010 | Chien | |
| 7,726,869 B2 | 6/2010 | Chien | |
| 7,832,917 B2 | 11/2010 | Chien | |
| 7,832,918 B2 | 11/2010 | Chien | |
| 7,871,192 B2 | 1/2011 | Chien | |
| 7,909,477 B2 | 3/2011 | Chien | |
| 8,083,377 B2 | 12/2011 | Chien | |
| 8,128,274 B2 | 3/2012 | Chien | |
| 8,545,090 B2 | 10/2013 | Chien | |
| 8,721,160 B2 | 5/2014 | Chien | |
| 8,827,511 B2 | 9/2014 | Chien | |
| 2004/0027831 A1 | 2/2004 | Huang | |
| 2005/0018450 A1 | 1/2005 | Chien | |
| 2005/0111213 A1 | 5/2005 | Smith | |
| 2006/0221594 A1 | 10/2006 | Thuot Rann et al. | |
| 2006/0227831 A1 | 10/2006 | Nishida et al. | |
| 2007/0076437 A1 | 4/2007 | Chien | |
| 2007/0081423 A1 | 4/2007 | Chien | |
| 2007/0109813 A1 | 5/2007 | Copeland et al. | |
| 2007/0242485 A1 | 10/2007 | Chien | |
| 2008/0062685 A1 | 3/2008 | Belliveau et al. | |
| 2008/0205060 A1 | 8/2008 | Chien | |
| 2009/0284960 A1 | 11/2009 | Chien | |

OTHER PUBLICATIONS http://www.amazon.com/Rite-Lite-LPL743W-Pivot-Swivel/dp/B001B5125K, date first available: Aug. 25, 2003.

* cited by examiner

LED NIGHTLIGHT SYSTEM HAVING AN IMAGE PROJECTION FEATURE

CROSS-REFERENCE TO RELATED APPLICATIONS

This is a continuation-in-part of U.S. patent application Ser. No. 12/834,435 filed Jul. 12, 2010, which is a divisional of U.S. patent application Ser. No. 12/292,153 filed Nov. 12, 2008, now issued as U.S. Pat. No. 7,871,192 and priority benefit is claimed for all common subject matter thereof.

INCORPORATION-BY-REFERENCE

The content of above identified patent applications is incorporated herein by reference in their entirety. The content of U.S. Pat. No. 8,721,160 is further incorporated herein by reference in its entirety.

TECHNICAL FIELD

This disclosure relates to lighting fixtures, more particularly to nightlights with image projecting features.

BACKGROUND

The near universal market for lighting fixtures, including nightlights, is an integral facet of modern life. The multitude of nightlight devices represents a large potential market opportunity for products that can be meaningfully distinguished from the standard ubiquitous nightlight.

These devices have unique attributes that have significant impacts on manufacturing and design, in that they must be generally small, lightweight, and rich in functionality and they must be produced in high volumes at relatively low cost. The lighting fixture industry has witnessed ever-increasing commercial competitive pressures, along with growing consumer expectations and the diminishing opportunities for meaningful product differentiation in the marketplace.

Prior developments include the use of low wattage bulbs. One shortcoming from low wattage bulbs is that they radiate too much heat which requires a large distance from the bulb to the optics. Larger distances increase the size and weight of the device. Further, due to the large amounts of heat that radiate from the low wattage bulb, the devices required the use of glass, which further increased size, weight, cost, manufacturing complexity, and simultaneously decreased the safety of the device to the end user. Ease of use also suffered because the heavier devices had trouble staying affixed to a wall socket.

Another prior development enabled an image to be seen on a display screen. While this solved some problems it required a significantly more complicated manufacturing process and greatly increased costs. This development was not practical for a low cost application.

Another prior development attempted to project an image onto a surface parallel to a path of the light by implementing more optics including: reflector mirrors, condensing lenses, adjusting lenses, grating lenses, and projecting lenses. These extra optics greatly increased complexity and cost of manufacture, and increased weight. Some of these lenses were required to be made of glass, which increased weight, was fragile, and increased costs.

In view of the ever-increasing commercial competitive pressures, along with growing consumer expectations and the diminishing opportunities for meaningful product differentiation in the marketplace, it is critical that answers be found for these problems. Additionally, the need to reduce costs, reduce production time, improve efficiencies and performance, and meet competitive pressures, adds an even greater urgency to the critical necessity for finding answers to these problems.

Thus, a need remains for smaller, lighter, more robust, lower cost, and feature rich nightlights. Solutions to these problems have been long sought but prior developments have not taught or suggested any solutions and, thus, solutions to these problems have long eluded those skilled in the art.

SUMMARY

A light emitting diode nightlight system, providing projected images with significantly reduced complexity, cost, and increased safety, is disclosed. The light emitting diode nightlight system can include: a tube housing; a light emitting diode positioned at one end of the tube housing, the light emitting diode for providing a visible light beam; a lens positioned within the tube housing and at a different end of the tube housing from the light emitting diode; and an optical component positioned within the tube housing, the optical component positioned between the light emitting diode and the lens, and the optical component arranged perpendicularly to the visible light beam and configured to create an image from the visible light beam.

It is contemplated that some embodiments can project a light image on a wall, ceiling, floor, and other desired surface. It is contemplated that these embodiments can project the light image on any desired location to enable people to view an image such as a star, moon, planet, silver-river, universal image, cartoon character, family photos, or other favorite image. These contemplated embodiments can provide people pleasure or comfort in a dark environment or when falling asleep and especially with children.

It is further contemplated that other embodiments can provide a nightlight without hazardous glass lenses, but instead can provide a tube type lens assemblies, telescope adjustability, and a hinge box to install the a slide, film, or display of changing images, and lenses. It has been discovered that implementing these elements increases light functionality and lighting effects to provide exceptional image quality.

It is further contemplated that other embodiments can incorporate an adjustable-focus to adjust the distance between a slide and optic-lens to maintain a sharp and clear image on any surface.

It is further contemplated that other embodiments may incorporate a housing with a ball shape, or sphere shape, or some fraction of a ball shape to hold a projector head inside and rotate. It has been discovered that rotating panning or tilting the spherical housing can provide 360 degree coverage for the projected image on the interior surface of a room.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The nightlight system is illustrated in the figures of the accompanying drawings which are meant to be exemplary and not limiting, in which like reference numerals are intended to refer to like components, and in which.

DETAILED DESCRIPTION

Figure 1:
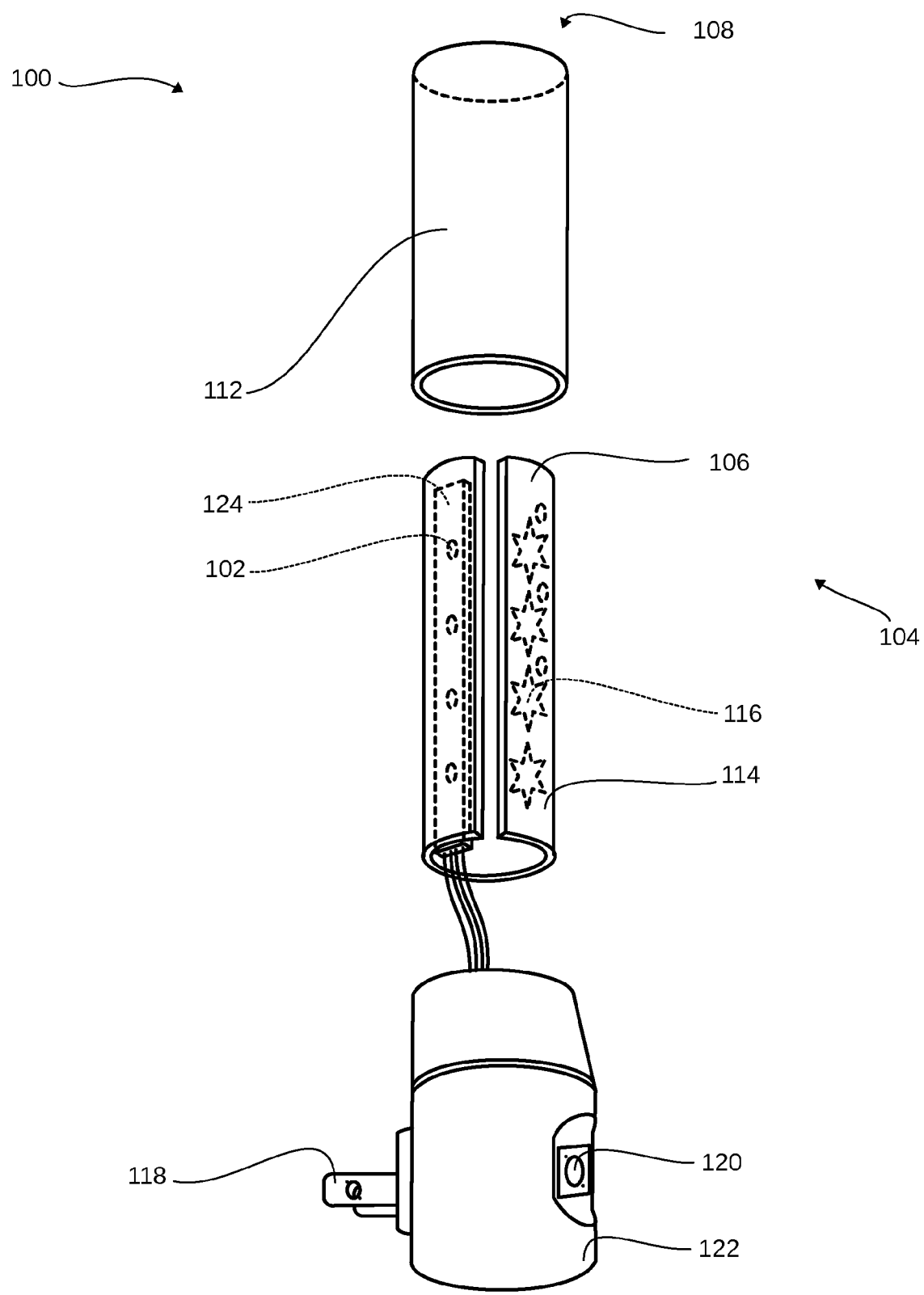
FIG. 1 is an exploded isometric view of the nightlight system in a first embodiment.

In the following description, reference is made to the accompanying drawings that form a part hereof, and in which are shown by way of illustration, embodiments in which the nightlight system may be practiced. It is to be understood that other embodiments may be utilized and structural changes may be made without departing from the scope of the nightlight system.

When features, aspects, or embodiments of the nightlight system are described in terms of steps of a process, an operation, a control flow, or a flow chart, it is to be understood that the steps can be combined, performed in a different order, deleted, or include additional steps without departing from the nightlight system as described herein.

The nightlight system is described in sufficient detail to enable those skilled in the art to make and use the nightlight system and provide numerous specific details to give a thorough understanding of the nightlight system; however, it will be apparent that the nightlight system may be practiced without these specific details.

In order to avoid obscuring the nightlight system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the nightlight system can be operated in any orientation.

As used herein, the term system is defined as a device or method depending on the context in which it is used. For expository purposes, the term "horizontal" as used herein is defined as a plane parallel to the top plane or surface of the base housing, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

It is contemplated that the embodiments described below can implement the theory and teachings of the U.S. Pat. No. 8,721,160 in the design, placement, size, and operation of the optical components.

Referring now to FIG. 1, therein is shown an exploded isometric view of the nightlight system 100 in a first embodiment. The nightlight system 100 can form an image by having light emitting diodes (LEDs).

The LEDs 102 provide a light source to supply visible light beams. Incorporated with the LEDs 102 are optical components 104. It is contemplated that the optical components 104 can be a film 106, transparent material 112, translucent material 114, diffraction grating, holographic optical elements, slides, films, openings, or cutouts, or a combination thereof.

It is contemplated that either the transparent material 112 or the translucent material 114 can be the diffraction grating, the holographic optical elements, the slide, or the film. It is further contemplated that the transparent material 112 or the translucent material 114 can include the openings, or the cut-outs.

In the present contemplated embodiment the optical components 104 can be in the form of a laser processed film or injection piece that forms the incoming LED light beam into a desired light image such as a star, dots, circle or any other image 116. The image 116 in the present embodiment is depicted as a combination of stars and dots.

It is further contemplated that the image 116 can be a message, data, logo, time, or a combination thereof. The image 116 can be projected on a ceiling, wall, floor, surface, the optical components 104, or a combination thereof. It is contemplated that the optical components 104 and can be connected to an electric motor (not shown) to rotate and change the position of the image 116 on the projected surface whether it be a wall, ceiling, or the translucent material 114.

The nightlight system 100 is further depicted with a power source 118. The power source 118 is depicted as an AC outlet; however it is contemplated that the power source 118 could also be a DC power source incorporating a battery.

The power source 118 can be coupled to a circuit (not shown), and a trigger 120. It is contemplated that the trigger 120 can be a switch or a sensor to turn on and off the LEDs 102. As an illustrative example, it is contemplated that the trigger 120 can be an optical sensor that can detect a change in the light level of a room, such as when a room gets dark.

In some contemplated embodiments the trigger 120 can, in conjunction with the circuit, turn on the nightlight system 100. In other contemplated embodiments the trigger 120 can turn on the nightlight system 100 autonomously. The power source 118 and the trigger 120 can be arranged to work with the LEDs 102 to provide a desired lighting effects of: timing, color, brightness, illumination, or a combination thereof.

It is contemplated that the LEDs 102 can form images on a surface of the optical components 104 by implementing a laser processed film or an injection piece situated in front of the LEDs 102. The image 116 projected on the optical components 104 can be on the film translucent material 114 or on an injection piece (not shown).

Around the trigger 120 is a base housing 122. The housing base can include the circuit and can further be coupled to the power source 118. Above the base housing 122 the LEDs 102 are depicted coupled to a conductor 124. The conductor 124 can be arranged in a straight configuration with the LEDs 102 arranged length-wise down the conductor 124.

The conductor 124 can be a printed circuit board, electric wires, isolated copper wires, and/or directly soldered LEDs, depending on market requirements. The conductor 124 is coupled to the power source 118 and powers the LEDs 102, which allows the LEDs 102 to emit a light beam to the optical components 104.

Portions of the optical components 104, such as the transparent material 112 can provide a top housing coupled to the base housing 122. It is contemplated that the top housing can have a transparent lens, cone, or tube with optical properties to cause the image 116 to exhibit more eye-catching effect. It is contemplated that the top housing can be a plastic tube or a cone.

Figure 2:
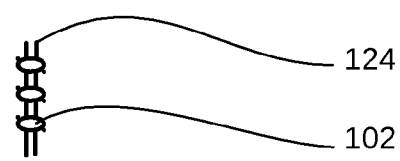
FIG. 2 is an exemplary LED string for the nightlight system of FIG. 1.

Referring now to FIG. 2, therein is shown an exemplary LED string for the nightlight system 100 of FIG. 1. The LEDs 102 are arranged in a row and affixed to the conductor 124.

The conductor 124 is depicted as two isolated copper wires. The LEDs 102 and the conductor 124 can be sealed by an epoxy.

Figure 3:
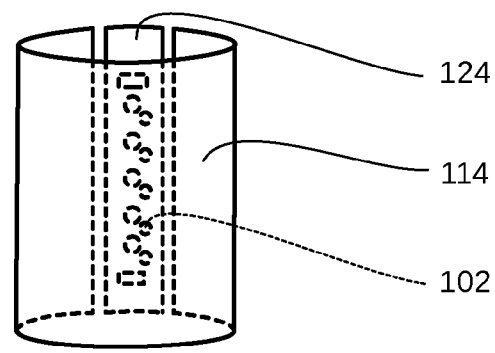
FIG. 3 is an exemplary film for the nightlight system of FIG. 1.

Referring now to FIG. 3, therein is shown an exemplary translucent material 114 for the nightlight system 100 of FIG. 1. The translucent material 114 is depicted as a laser processed cylindrical film or injection molded piece. The translucent material 114 is depicted having the LEDs 102 coupled to the conductor 124 and mounted thereto.

Figure 4:
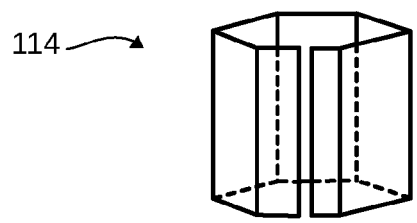
FIG. 4 is an exemplary film for the nightlight system of FIG. 1.

Referring now to FIG. 4, therein is shown an exemplary film for the nightlight system of FIG. 1. The translucent material 114 is depicted as a hexagonal laser processed film or injection molded piece.

Figure 5:
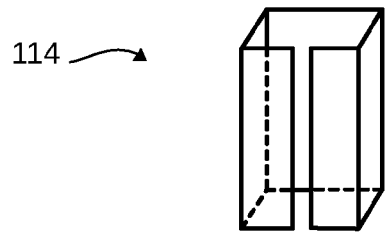
FIG. 5 is an exemplary film for the nightlight system of FIG. 1.

Referring now to FIG. 5, therein is shown an exemplary film for the nightlight system of FIG. 1. The translucent material 114 is depicted as a rectangular laser processed film or injection molded piece.

Figure 6:
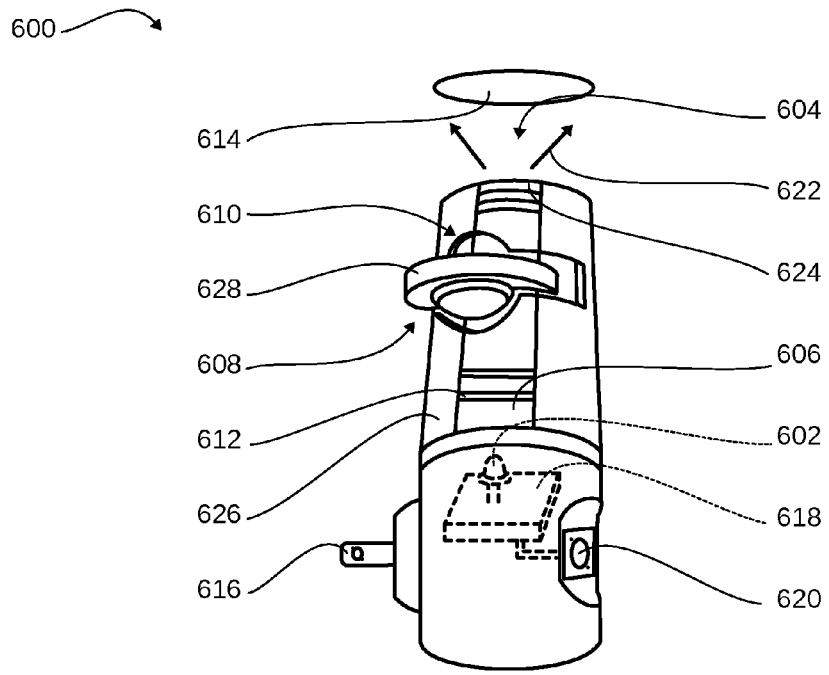
FIG. 6 is an isometric view of the nightlight system in a second embodiment.

Referring now to FIG. 6, therein is shown an isometric view of the nightlight 600 system in a second embodiment. The nightlight system 600 is shown having LEDs 602.

The LEDs 602 serve as a light source to supply visible white light beams. The nightlight system 600 can include optical components 604. The optical components 604 can include a tube housing 606, a translucent material 608, a laser treated transparent material, cutouts 610, diffraction grating 612, or a combination thereof.

It is contemplated that the translucent material 608 can be laser processed slides, film, or injected molded pieces. The optical components 604 can be combined in any combination to form a narrow LED spot light into an evenly distributed light beam over a larger area or surface.

The optical components 604 including the diffraction grating 612 can be used to produce a hologram of an image 614. It is contemplated that the image 614 can further be a message, data, logo, time, or a combination thereof.

It is contemplated the image 614 can be projected or displayed on a ceiling, walls, floor, other surface, or the surface of the optical components themselves. A power source 616 can be coupled to a circuit 618 and trigger 620.

The power source 616, the circuit 618, and the trigger 620 can be arranged to power and control the LEDs 602. The LEDs 602 can be controlled to produce a desired light effects including: timing, color, brightness, and/or illumination.

The translucent material 608 that are depicted as slides or film are contemplated to be changeable. Further the optical components 604 of the nightlight system 600 are contemplated to provide adjustable angle, position, orientation, light, and light effects for the image 614.

The LEDs 602 supply a light beam 622 to project the image 614 from a tiny image on the translucent material 608, depicted as slides. The light beam 622 is then magnified by the optical components 604 such as lenses 624. The image 614 then becomes bigger when projected out of the nightlight system 600 onto a surface.

The nightlight system 600 includes an outer housing depicted as a top housing 626 with an opening (not shown) above the lenses 624 to allow the tube housing 606 and the lenses 624 to be installed and to project the image 614 from the opening onto a ceiling. The top housing 626 also includes the cutouts 610 to allow a disc 628 to be installed and change the image 614 on the translucent material 608 by rotating the disc 628 to one of the images 614.

The image 614 may be captured within the translucent material 608 in the form of a slide, a film, an electronic display, or a combination thereof. It is contemplated that the disc 628 can hold any combinations of the slides, films, or electronic displays and can rotate between them so that the image 614 contained on them will be projected and displayed. It is further contemplated that the disc 628 can be changed to update the nightlight system 600 with new images 614.

Figure 7:
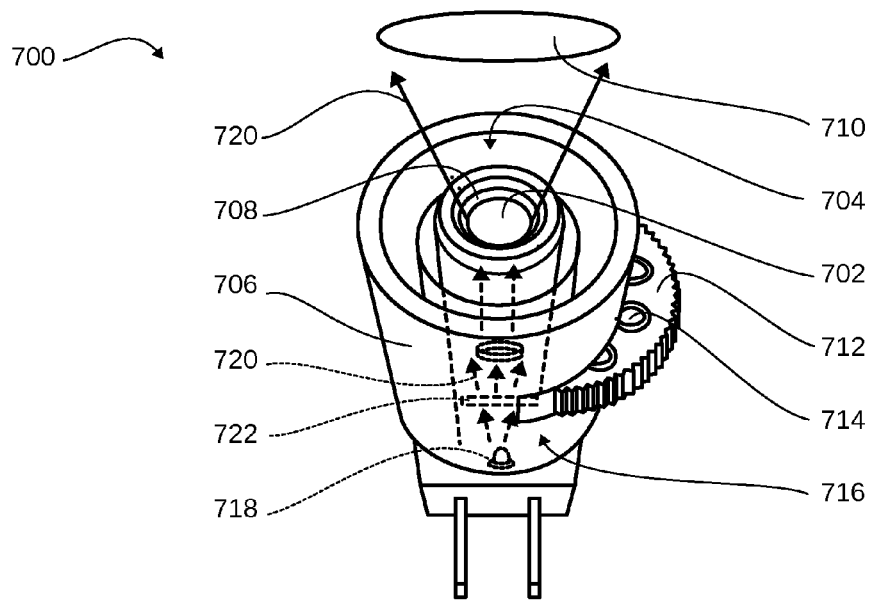
FIG. 7 is an isometric view of the nightlight system in a third embodiment.

Referring now to FIG. 7, therein is shown an isometric view of the nightlight system 700 in a third embodiment. The nightlight system is shown having a top lens 702 within a top lens opening 704.

The top lens opening 704 is inside an outer housing depicted as a top housing 706. The top lens opening 704 allows a tube housing 708 to be installed and allows an image 710 to pass through the top lens 702 and to be projected larger onto a ceiling.

A disc 712 has a translucent material implemented as slides 714 that contain the images 710. The slides 714 can be changed by rotating the disc 712. The top housing 706 is depicted including a cutout 716 to facilitate installation of the disc 714. LEDs 718 are shown to have a light beam 720.

In one contemplated embodiment the light beam 720 has pretty wide viewing angle and can cover the inner diameter of tube housing 708 so there is no need to include a transparent or translucent light beam spreader, which would increase costs. Other contemplated embodiments utilizing LEDs 718 with less viewing angle can include light beam spreaders 722. In yet other contemplated embodiments the light beam spreaders could be replaced with lenses to focus and narrow the light beam 720 onto the slides 714.

The light beam 720 can pass through the slides 714 arranged on the disc 712 and aligned with the LEDs 718 within the top housing to project the image 710 contained thereon. The image 710 begins small on the slide 714 and is enlarged as it is projected from the top lens 702 onto a ceiling.

The tube housings 708 can be moved so that the size and focus of the image 710 on the ceiling can be changed. The tube housings 708 can be a tube with moveable lenses therein that can change the relationship of the lenses relative to each other and relative to the slide 714.

The nightlight system 700 is shown having a power source 702 in the shape of prongs. It has been discovered that implementing the tube housings 708 along with the optical components 704 and the slides 714 can allow an image 604 to be shown much larger six to thirty feet away on a ceiling or three to one hundred feet away on a wall.

Figure 8:
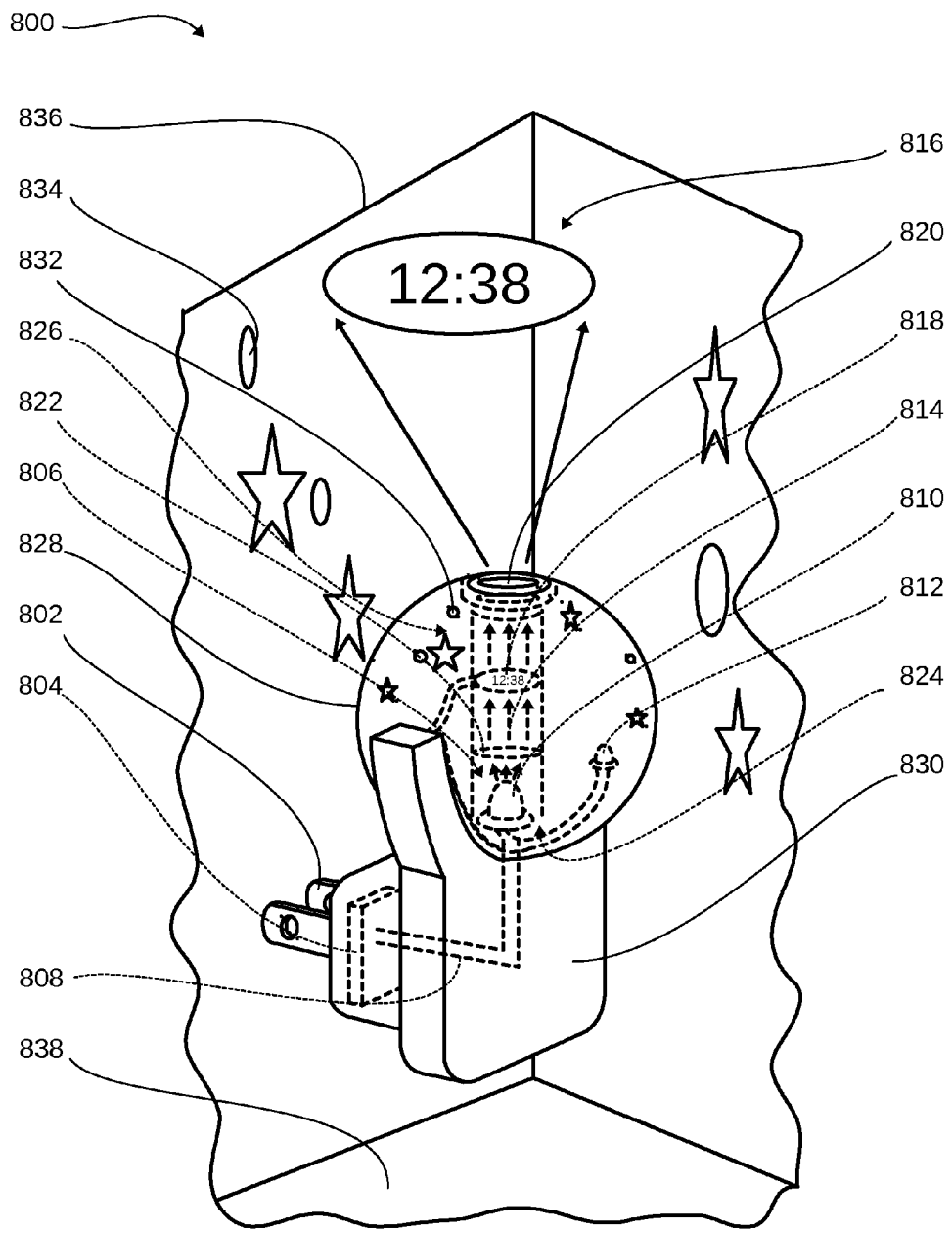
FIG. 8 is an isometric view of the nightlight system in a fourth embodiment.

Referring now to FIG. 8, therein is shown an isometric view of the nightlight system 800 in a fourth embodiment. The nightlight system 800 is shown with a power source 802 configured to couple with a wall AC socket. The power source 802 is coupled to a circuit 804. The circuit 804 is coupled to LEDs 806 with conductors 808.

The LEDs 806 can be arranged as an inner LED 810 and an outer LED 812. The inner LED 810 supplies a bright light beam 814 to project an image 816.

The image 816 can reside on a slide 818. The image 816 can be projected with the light beam 814 from the slide 818 through an optical component such as a top lens 820. The light beam 814 of the inner LED 810 can be a narrow spot light and can pass through a second optical component such as a lower lens 822. The light beam 814 being narrow can be made parallel as the light beam 814 passes through the lower lens 822.

The slide 818 can be a changeable digital data display such as a liquid crystal display (LCD) or a thin film transistor (TFT) screen. The slide 818 is depicted having the image 816 being a digital time. The slide 818 can display a small version of the image 816, as the light beam 814 passes through the slide 818; the image is carried by the light beam 814 to the top lens 820 where it is projected and enlarged.

It is contemplated that the enlarged version of the image 816 can be displayed on a surface such as a wall or ceiling. It is further contemplated that the image 816 can be enlarged tens or hundreds of times. It is contemplated that other images 816 than time can be displayed and projected in this manner.

The inner LED 810 is shown on one end of a tube housing 824. The top lens 820 is on the other end of the tube housing 824. The tube housing 824 can be tube-like in construction and include a hinge-box 826. The hinge-box 826 can include the slide 818 and the lower lens 822.

The lower lens 822, the slide 818 and the top lens 820 can be positioned to relative to each other and relative to the inner LED 810 to provide a sharp image of the right size as the image 816 is projected on a surface. The top lens 820, the lower lens 822, and the slide 818 are contemplated to be moveable relative to each other and relative to the inner LED 810 to adjust the focus and the size of the image 816 as it is projected on a surface.

The tube housing 824 and the hinge-box 826 can provide a sealed housing for the top lens 820, the lower lens 822, and the slide 818. It is contemplated that the nightlight system 800 can include an outer housing depicted as a top housing 828 and a base housing 830. The base housing 830 can encompass and enclose the circuit 804, the conductors 808 and can be moveably coupled to the top housing 828.

The top housing 828 is depicted as a spherical shape coupled to the base housing 830 at sides of the top housing 828. The top housing 828 is contemplated to be rotatable about the coupling points of the base housing 830 and the top housing 828; that is, the top housing 828 can be rotated in a tilt fashion while the base housing remains stationary.

Rotating the top housing 828 allows the image 816 to be projected onto different places or surfaces. It is contemplated that in other embodiments the top housing 828 could be adjusted to change the position of the image 816 by moving, pushing, or rotating the top housing 828. The top housing encases and encompasses the LEDs 806, tube housing 824, the lower lens 822, and the slide 818.

It is further contemplated that the top housing 828 may have a screw (not shown) or ditch (not shown) or other adjustment mechanism to change the position of the slide relative to the lower lens 822 or the upper lens 820. This adjustment can change the size and focus of the image 816 as it is displayed or projected.

The outer LED 812 is contemplated to illuminate the top housing 828. In some contemplated embodiments the outer LED 812 is contemplated to simply make the top housing 828 glow. Other contemplated embodiments, such as the one depicted, allow the light from the outer LED 812 to pass through holes 832 in the top housing 828, which in turn direct the light from the outer LED 812 onto a surface in a particular pattern corresponding to the shape of the holes 832.

The holes 832 are contemplated to be laser etched patterns or pin-hole images and to produce secondary images 834. The holes 832 are configured to enlarge the patterns or shapes of the holes 832 without diluting the image as it is projected on a surface. The holes 832 are shown as planets or stars and the secondary images 834 are projected onto a wall 836.

The patterns and shapes of the holes 832 should be configured so that the secondary images 834 are readable. It is contemplated that the holes 832 could be transparent material or translucent material allowing the light from the outer LED 812 to pass therethrough and to project the secondary images 834.

It is contemplated that the secondary images 834 could be projected onto the walls 836, a floor 838 and a ceiling. The secondary images 834 could be projected onto the walls 836, the ceiling, and the floor 838 along with the image 816.

It is contemplated that the secondary images 834 and the image 816 can be projected onto a surface perpendicular to a path of the light beam 814 or the light from the outer LED 812. It has been discovered that projecting the secondary images 834 and the image 816 with the optical components reduces the number of components needed, reduces design complexity, reduces manufacturing complexity, and reduces cost while simultaneously reducing size, and mechanical rigidity of the nightlight system 800.

It has been discovered that the secondary images 834 can be very clear and readable even from far away when using the outer LED 812. It has been discovered that if the holes 832 are too big, then, the secondary image 834 becomes too big, washed out, and unreadable.

The top housing 828 can be more than a half of a sphere or, in other words, the top housing 828 can have an angular surface spanning more than 180 degrees. It has been discovered that having the top housing 828 being more than a half of a sphere allows configuration of the holes 832 so that the secondary image 834 can be properly projected onto a surface.

Figure 9:
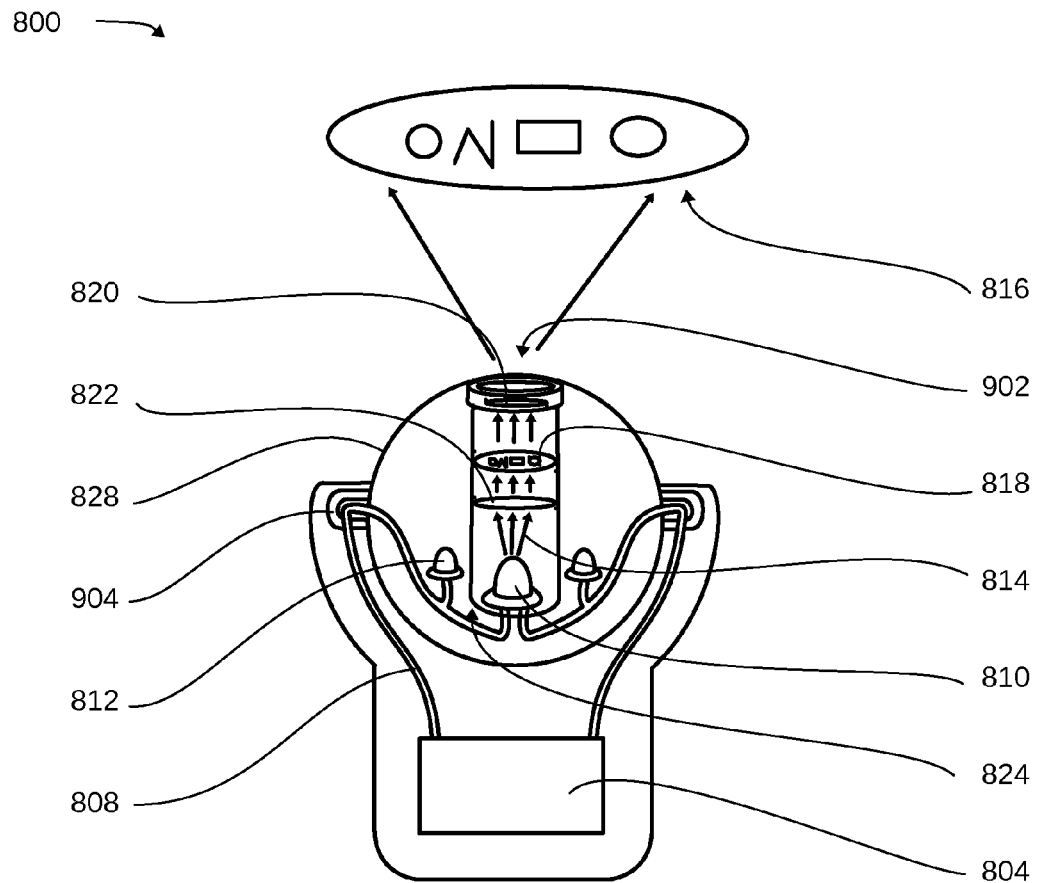
FIG. 9 is a cross-sectional view of the nightlight system of FIG. 8.

Referring now to FIG. 9, therein is shown a cross-sectional view of the nightlight system 800 of FIG. 8. The slide 818 is shown and contemplated to be a slide, film, changing digital data display/screen, and disc. In one contemplated embodiment slide 818 can incorporate a fixed image 816, while in other contemplated embodiments the image 816 can be changed.

The inner LED 810 serves as a light source to supply the light beams 814 in the visible electro-magnetic spectrum. The light beam 814 from the inner LED 810 is depicted as a narrow spot light beam.

The light beam 814 may pass through the lower lens 822. The lower lens 822 can be a transparent material or laser-treated diffraction grating. The lower lens 822 can form the light beam 814 into a narrower beam or form the light beam 814 into a wider parallel light beam with even brightness.

It is contemplated that the lower lens 822 can be omitted in some embodiments to reduce weight and manufacturing complexity when the inner LED 810 is capable of providing appropriate light to illuminate the slide 818 and produce the image 816. The tube housing 824 can be combined with the inner LED 810. It is contemplated that the tube housing 824 can further be combined with other LEDs or other LED arrangements disclosed herein.

The slide 818 is depicted within the tube housing 824 along with the lower lens 822. The tube housing 824 can extend from the inner LED 810 to a top opening 902 of the top housing 828. The image 816 can be projected from the top opening 902.

The top opening 902 is shown to be constructed as a cut-out, a transparent material piece, a translucent material piece, a diffraction grating, and a holographic optical element. The image 816 projected from the top opening 902 is contemplated to be a message, data, a logo, a time, or a combination thereof.

As shown in FIG. 8, the image 816 can be projected on a ceiling, walls, a floor, other surface, or even the surface of the optical components themselves. The power source 802 of FIG. 8, the circuit 804, and trigger 120 of FIG. 1 are arranged to power and control the inner LED 810 or the outer LEDs 812 to achieve a desired light effects including: timing, color, brightness, illumination, or a combination thereof.

The top housing 828 can be coupled to the base housing 830 at sides of the top housing 828 so that the top housing can rotate while coupled to the base housing. The conductors 808 are shown extending from the circuit 804 through the base housing 830 and into the top housing 828 through the sides of the top housing 828.

The conductors 808 can be configured to deliver electric signals to the inner LED 810 and the outer LEDs 812. The conductors 808 are shown to have a rotatable electric connector 904 allowing an electric signal from the circuit 804 to be delivered to the inner LED 810 and outer LEDs 812 while permitting the top housing 828 to rotate and project the image 816 on different surfaces relative to the nightlight system 800.

Figure 10A:
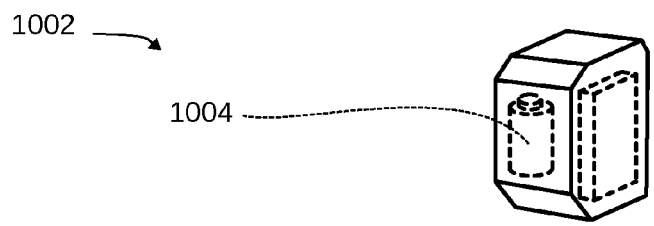
FIG. 10A: is an isometric view of an alternative DC power source for use with the nightlight system of FIG. 8.

Referring now to FIG. 10A, therein is shown an isometric view of an alternative DC power source 1002 for use with the nightlight system 800 of FIG. 8. The DC power source 1002 can implement and utilize batteries 1004. It is contemplated that the DC power source 1002 could further include a solar charger, USB power, transformer power, adaptor power, generator power, or other DC power connection, supply, or storage.

Referring now to FIGS. 10B-10J, therein are shown side views of lens-assemblies for use with the nightlight system of FIG. 8. It is contemplated that the lens-assemblies of FIGS. 10B-10J could be used interchangeably with the nightlight system of the present disclosure.

It has been discovered that the lens-assemblies of FIGS. 10B-10J can provide a compact dimension allowing the nightlight system to have a smaller form factor or to have a form factor with much greater design freedom. In some contemplated embodiments the lens-assemblies can be used to reduce the distance from an LED tip to a slide or optical component. It has been discovered that the distance can be reduced to zero so that the slide contacts other optical components or LEDS.

Figure 10B:
FIGS. 10B-10J are side views of lens-assemblies for use with the nightlight system of FIG. 8.
Figure 10C:
Figure 10D:
Figure 10E:
Figure 10F:
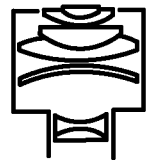
Figure 10G:
Figure 10H:
Figure 10I:
Figure 10J:
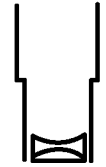

Specifically referring to the lens-assemblies of FIGS. 10B-10J, the lens-assembly of FIG. 10B is shown to be a Huygenian lens, the lens-assembly of FIG. 10C is shown to be a Rank-modified Kellner Eyepiece (RKE) lens, the lens-assembly of FIG. 10D is shown to be a Kellner lens, the lens-assembly of FIG. 10E is shown to be a Ramsden lens, the lens-assembly of FIG. 10F is shown to be a Nagler lens, the lens-assembly of FIG. 10G is shown to be a Plossl lens, the lens-assembly of FIG. 10H is shown to be an Orthoscopic lens, the lens-assembly of FIG. 10I is shown to be a Erfle lens, and the lens-assembly of FIG. 10J is shown to be a BaHow lens.

Figure 11:
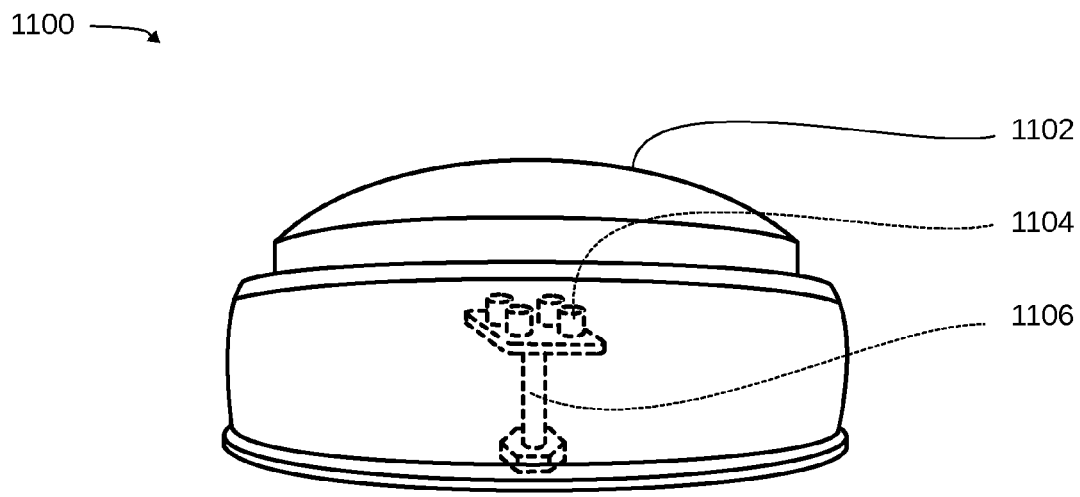
FIG. 11 is a side view of the nightlight system in a fifth embodiment.

Referring now to FIG. 11, therein is shown a side view of the nightlight system 1100 in a fifth embodiment. The nightlight system 1100 is depicted including optical components including a top lens 1102 and a light source including LEDs 1104.

Figure 14:
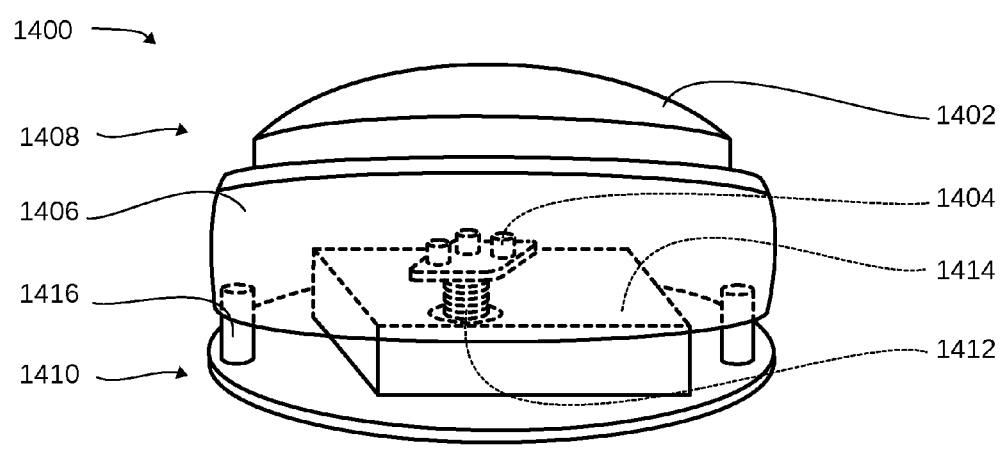
FIG. 14 is an isometric view of the nightlight system in a sixth embodiment.
Figure 15:
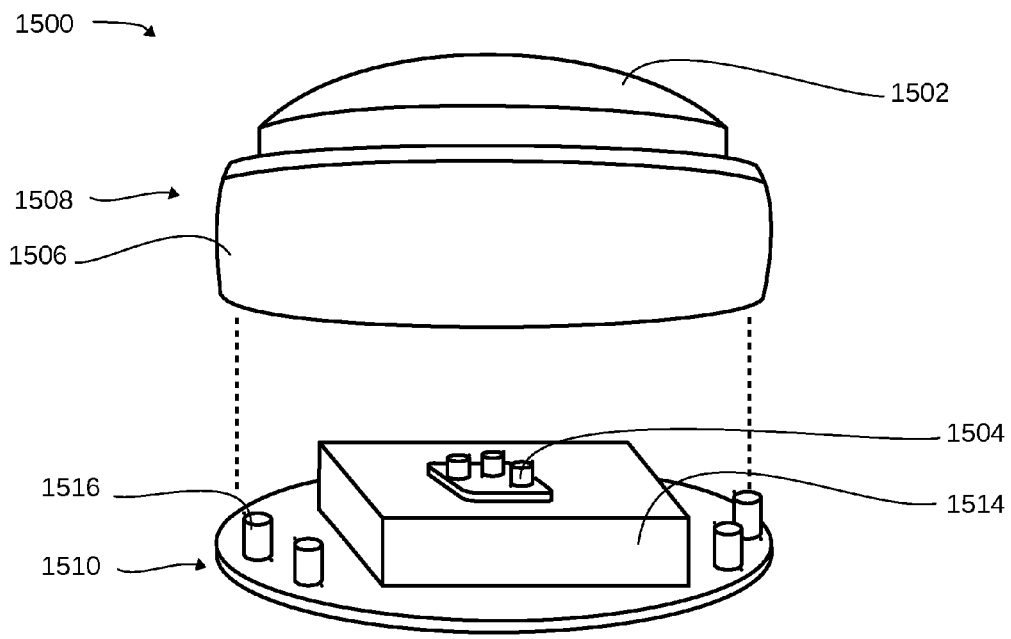
FIG. 15 is an exploded isometric view of the nightlight system in a seventh embodiment.

It is contemplated that the LEDs 1104 can be arranged at various distances from the top lens 1102 as can be seen from between the embodiments of FIGS. 11, 14, and 15. The top lens 1104 can include openings, cut-outs, laser processed film or injection molded material.

The nightlight system 1100 is further shown having a height adjuster 1106 to raise and lower the LEDs 1104. Adjusting the height of the LEDs 1004 allows for an image to be shown or projected on various surfaces.

The LEDs 1104 are contemplated to include a lens incorporated in the body of the LEDs 1104. Because the top lens 1102 can include an image there on as openings, cut-outs, laser processed film or injection molded material raising and lowering the LEDs 1104 changes the distance between lenses on the LEDs 1104 and the image on the top lens 1102.

It is contemplated that the nightlight system 1100 can include a DC power source (not shown) utilizing batteries and/or a variety of input power sources as described above with regard to FIG. 10A.

Figure 12:
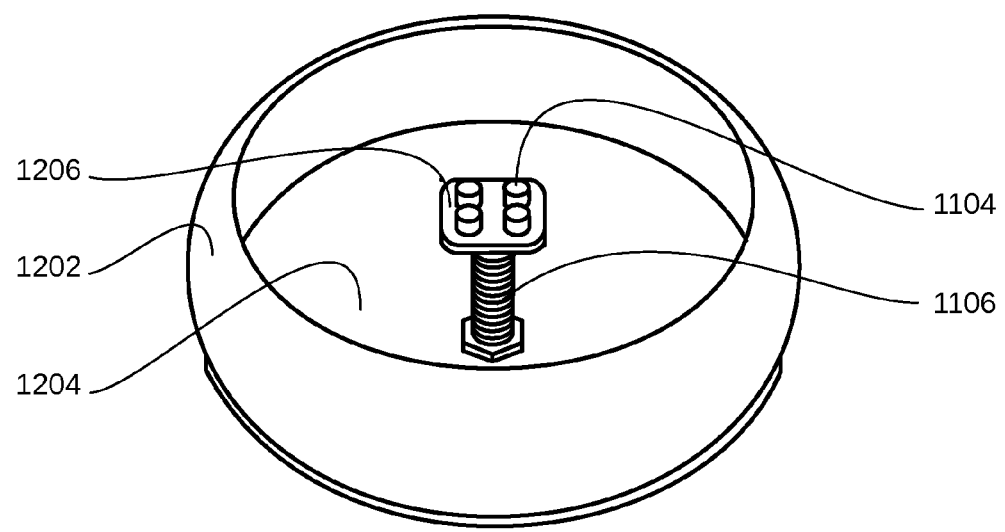
FIG. 12 is an isometric view of components of the nightlight system of FIG. 11.

Referring now to FIG. 12, therein is shown an isometric view of components of the nightlight system 1100 of FIG. 11. The nightlight system 1100 is shown to include a wall 1202 located on a base housing 1204. The height adjuster 1106 can adjust the LEDs 1104 any distance between the height currently depicted level with the top of the wall 1202 to the level of the base housing 1204. The height of the LEDs 1204 would still include an offset from the level of the base housing 1204 to account for a circuit 1206 below the LEDs 1104.

Figure 13:
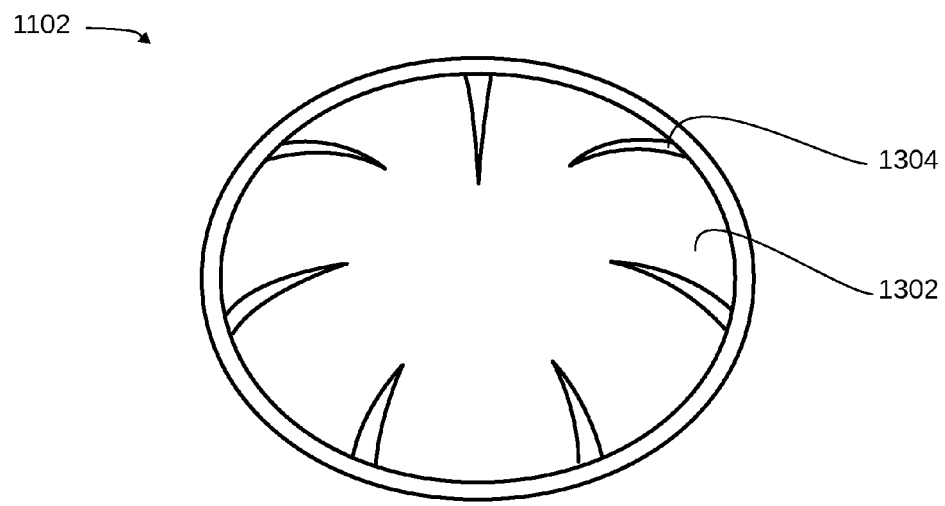
FIG. 13 is an isometric view of the film for the nightlight system of FIG. 11.

Referring now to FIG. 13, therein is shown an isometric view of the top lens 1102 for the nightlight system 1100 of FIG. 11. The top lens 1102 is shown in one optional configuration enabling a laser processed film 1302 to fit into a dome shape of the top lens 1102.

The laser processed film 1302 can originate as a flat film and be processed to include multiple cuts 1304. The multiple cuts 1304 provide an economical solution to make a low-cost product. Another contemplated embodiment could produce a higher-end product by implementing an injection molded material utilizing diffraction grating or holographic optical elements.

Referring now to FIG. 14, therein is shown an isometric view of the nightlight system 1400 in a sixth embodiment. The nightlight system 1400 is shown having optical components including a top lens 1402 and a light source including LEDs 1404.

Around the LEDs 1404 and the top lens 1402 is a wall 1406 that supports the top lens 1402 and directs the light from the LEDs 1404 to the top lens 1402. The wall 1406 can be a part of a top housing 1408. Below the top housing 1408 is a base housing 1410.

The LEDs 1404 are mounted to a height adjuster 1412. The height adjuster 1412 extends from the LEDs 1404 to a power source 1414. The power source 1414 is contemplated to be a DC power source mounted directly to the base housing 1410.

Standoff pins 1416 are shown supporting the top housing 1408 above the base housing 1410 and providing an additional height adjustment or distance between the top lens 1402 and the LEDs 1404.

Referring now to FIG. 15, therein is shown an exploded isometric view of the nightlight system 1500 in a seventh embodiment. The nightlight system 1500 is shown having optical components including a top lens 1502 and a light source including LEDs 1504.

Below the top lens 1502 is a wall 1506 that supports the top lens 1502 and directs the light from the LEDs 1504 to the top lens 1502. The wall 1506 can be a part of a top housing 1508. Below the top housing 1508 is a base housing 1510.

The LEDs 1504 are mounted to a circuit 1512. The circuit 1512 is mounted between the LEDs 1504 and a power source 1514. The power source 1514 is contemplated to be a DC power source mounted directly to the base housing 1510.

Standoff pins 1516 are shown supporting the top housing 1508 above the base housing 1510 and providing an additional height adjustment or distance between the top lens 1502 and the LEDs 1504.

Figure 16:
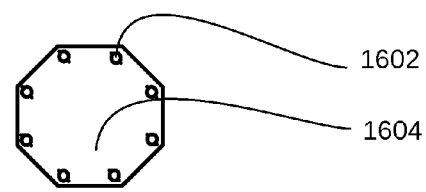
FIG. 16 is a top view of a first optional PCB arrangement for the nightlight system.

Referring now to FIG. 16, therein is shown a top view of a first optional PCB arrangement for the nightlight system. The first optional arrangement shows LEDs 1602 around a perimeter of an octagonal printed circuit board (PCB) 1604.

The LEDs 1602 can be arranged near corners of the PCB 1604. Optionally the LEDs 1602 can be arranged on the center area or edge of the PCB 1604 to face upward or outward for different requirements of the nightlight system or to vary the distance between optical components including a laser processed film or injection molded piece and the LEDs 1602. The PCB 1604 can be any size as long as it is smaller than a base housing of the nightlight system.

Figure 17:
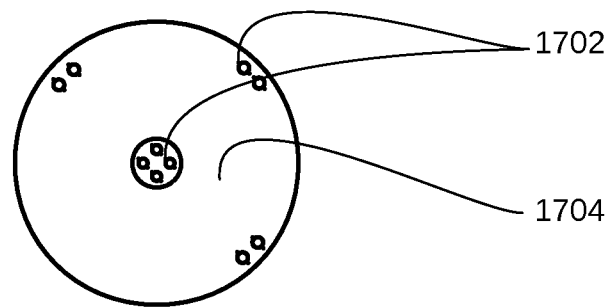
FIG. 17 is a top view of a second optional PCB arrangement for the nightlight system.

Referring now to FIG. 17, therein is shown a top view of a second optional PCB arrangement for the nightlight system. The second optional arrangement shows LEDs 1702 affixed at three points around a perimeter of circular PCB 1704 and arranged in the center of the PCB 1704.

The LEDs 1702 can be arranged on the center area or edge of the PCB 1704 to face upward or outward for different requirements of the nightlight system or to vary the distance between optical components including a laser processed film or injection molded piece and the LEDs 1702. The PCB 1704 can be any size as long as it is smaller than a base housing of the nightlight system.

Figure 18:
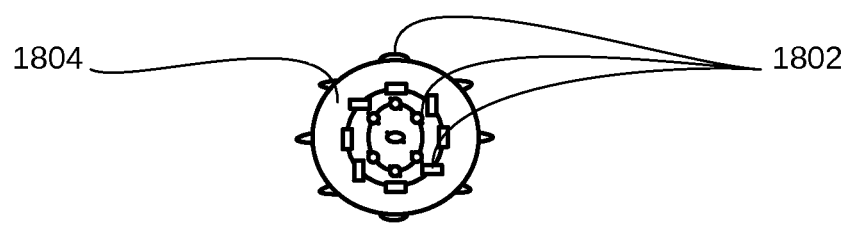
FIG. 18 is a top view of a third optional PCB arrangement for the nightlight system.

Referring now to FIG. 18, therein is shown a top view of a third optional PCB arrangement for the nightlight system. The third optional arrangement shows LEDs 1802 affixed at a perimeter of circular PCB 1804, arranged in the center of the PCB 1804, and arranged in a circular pattern on the PCB 1804.

The LEDs 1802 can be arranged on the center area or edge of the PCB 1804 to face upward or outward for different requirements of the nightlight system or to vary the distance between optical components including a laser processed film or injection molded piece and the LEDs 1802. The PCB 1804 can be any size as long as it is smaller than a base housing of the nightlight system.

Figure 19:
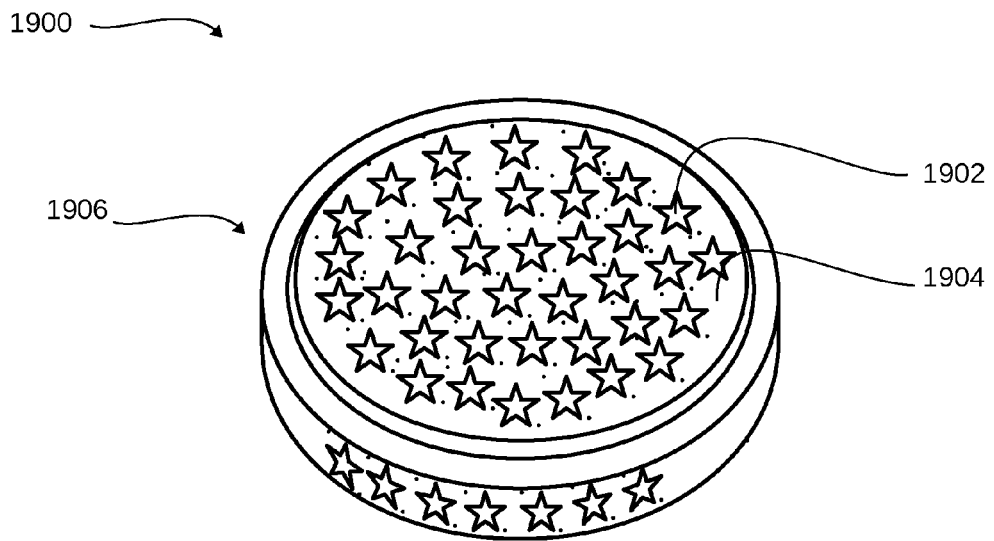
FIG. 19 is an isometric view of the nightlight system in an eighth embodiment.

Referring now to FIG. 19, therein is shown an isometric view of the nightlight system 1900 in an eighth embodiment. The nightlight system 1900 is shown having optical components including stars 1902 arranged on a top lens 1904.

The top lens 1904 is mounted to a top housing 1906. The optical components can also be the stars 1902 arranged along a side of the top housing 1906. The optical components can be pinhole projection holes, openings, cut-outs, windows with transparent areas, printed transparent substrates or films. It is contemplated that the optical components 1902 can be laser processed film, or an injection molded piece to project an image contained therein onto a surface.

Figure 20:
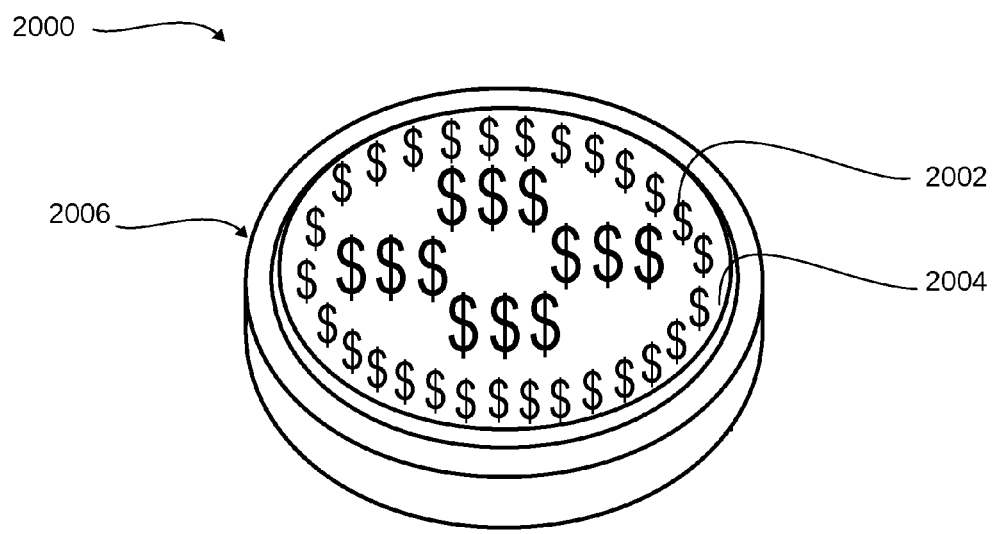
FIG. 20 is an isometric view of the nightlight system in a ninth embodiment.

Referring now to FIG. 20, therein is shown an isometric view of the nightlight system 2000 in a ninth embodiment. The nightlight system 2000 is shown having optical components including dollar signs 2002 arranged on a top lens 2004.

The top lens 2004 is mounted to a top housing 2006. The optical components can also be the dollar signs 2002 arranged along a side of the top housing 2006. The optical components can be pinhole projection holes, openings, cut-outs, windows with transparent areas, printed transparent substrates or films. It is contemplated that the optical components 2002 can be laser processed film, or an injection molded piece to project an image contained therein onto a surface.

Figure 21:
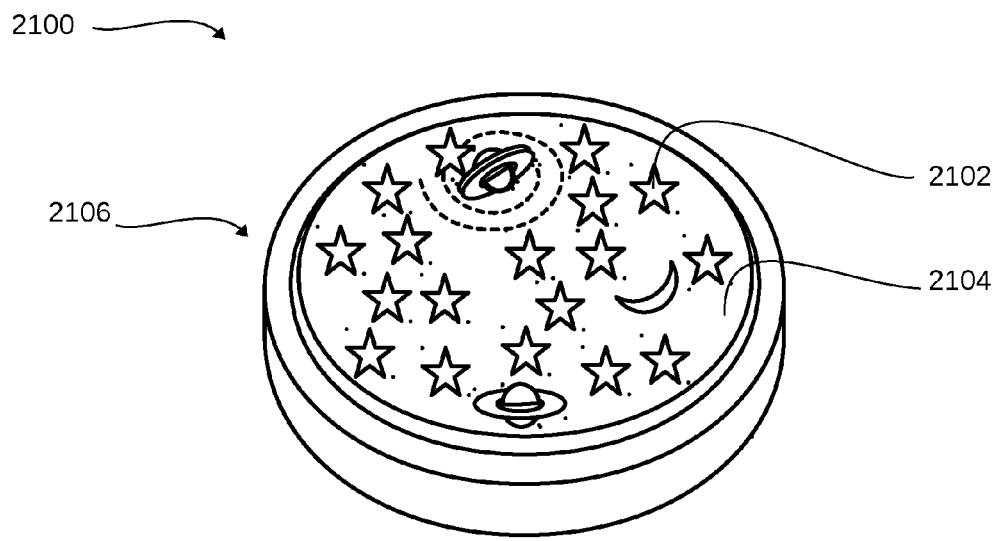
FIG. 21 is an isometric view of the nightlight system in a tenth embodiment.

Referring now to FIG. 21, therein is shown an isometric view of the nightlight system 2100 in a tenth embodiment. The nightlight system 2100 is shown having optical components including space images 2102 arranged on a top lens 2104.

The top lens 2104 is mounted to a top housing 2106. The optical components can also be the space images 2102 arranged along a side of the top housing 2106. The optical components can be pinhole projection holes, openings, cut-outs, windows with transparent areas, printed transparent substrates or films. It is contemplated that the optical components 2102 can be laser processed film, or an injection molded piece to project an image contained therein onto a surface.

Figure 22:
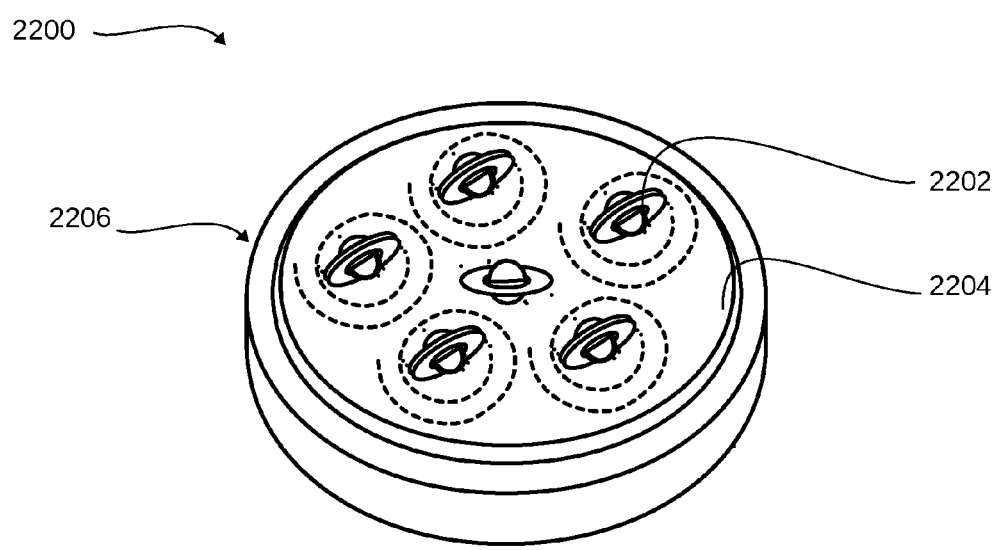
FIG. 22 is an isometric view of the nightlight system in an eleventh embodiment.

Referring now to FIG. 22, therein is shown an isometric view of the nightlight system 2200 in an eleventh embodiment. The nightlight system 2200 is shown having optical components including space images 2202 arranged on a top lens 2204.

The top lens 2204 is mounted to a top housing 2206. The optical components can also be the space images 2202 arranged along a side of the top housing 2206. The optical components can be pinhole projection holes, openings, cut-outs, windows with transparent areas, printed transparent substrates or films. It is contemplated that the optical components 2202 can be laser processed film, or an injection molded piece to project an image contained therein onto a surface.

Figure 23:
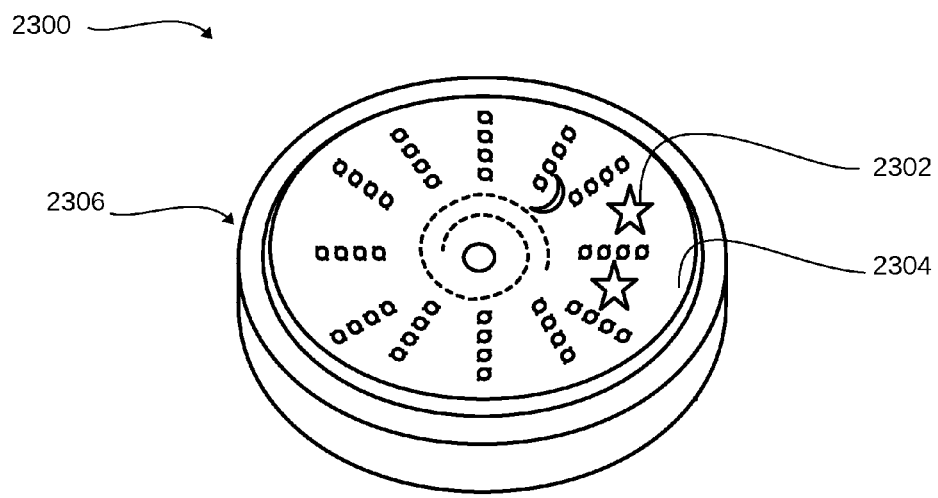
FIG. 23 is an isometric view of the nightlight system in a twelfth embodiment.

Referring now to FIG. 23, therein is shown an isometric view of the nightlight system 2300 in a twelfth embodiment. The nightlight system 2300 is shown having optical components including space images 2302 arranged on a top lens 2304.

The top lens 2304 is mounted to a top housing 2306. The optical components can also be the space images 2302 arranged along a side of the top housing 2306. The optical components can be pinhole projection holes, openings, cut-outs, windows with transparent areas, printed transparent substrates or films. It is contemplated that the optical components 2302 can be laser processed film, or an injection molded piece to project an image contained therein onto a surface. The space images 2302 are shown to include stars, dots, a silver river, and a moon.

Figure 24:
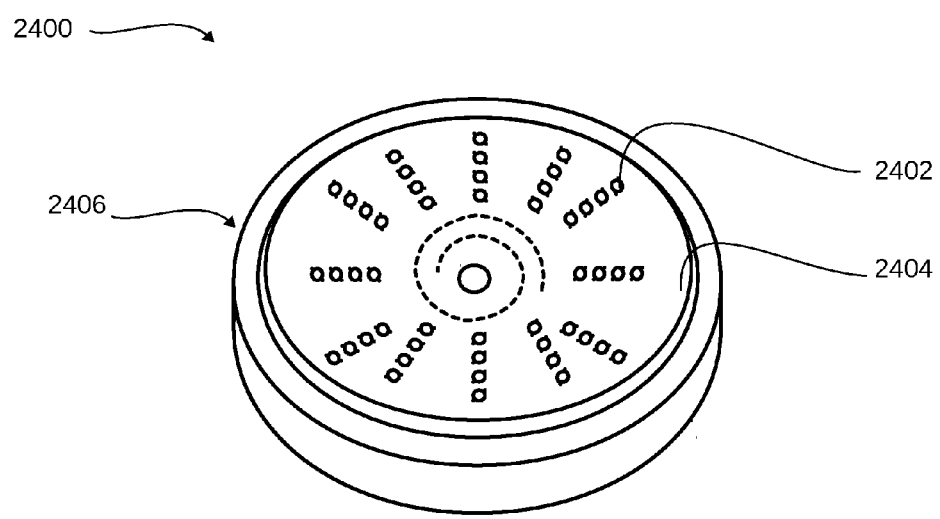
FIG. 24 is an isometric view of the nightlight system in a thirteenth embodiment.

Referring now to FIG. 24, therein is shown an isometric view of the nightlight system 2400 in a thirteenth embodiment. The nightlight system 2400 is shown having optical components including dashes and dots 2402 arranged on a top lens 2404.

The top lens 2404 is mounted to a top housing 2406. The optical components can also be the dashes and dots 2402 arranged along a side of the top housing 2406. The optical components can be pinhole projection holes, openings, cut-outs, windows with transparent areas, printed transparent substrates or films. It is contemplated that the optical components 2402 can be laser processed film, or an injection molded piece to project an image contained therein onto a surface.

Figure 25:
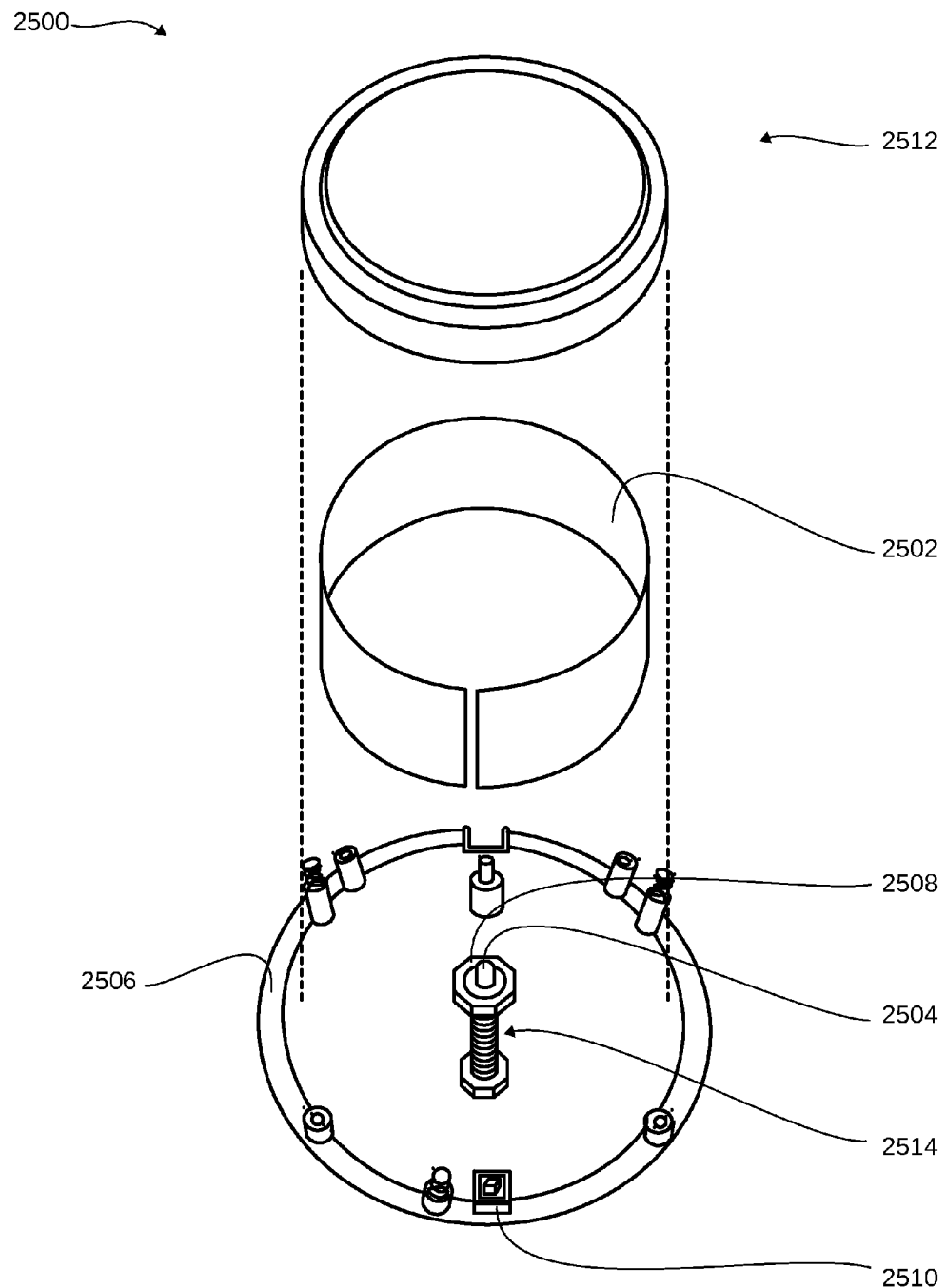
FIG. 25 is an exploded isometric view of the nightlight system in a fourteenth embodiment.

Referring now to FIG. 25, therein is shown an exploded isometric view of the nightlight system 2500 in a fourteenth embodiment. The nightlight system 2500 is shown having optical components 2502 and an LED 2504.

The LED 2504 serves as a light source to supply visible light beams. The optical components 2502 can be an optics-lens, a film, openings, cut-outs, laser-treated transparent material piece or translucent material piece, diffraction grating, holographic optical elements, or a combination thereof. The optical components 2502 can be used to create an image.

The image can be a message, data, logo, or time, and can be displayed or projected on a ceiling, walls, floor, other surface, on the optical components 2502, or a combination thereof. The nightlight system 2500 further includes a power source (not shown) under the base housing 2506, a circuit 2508, and a trigger 2510.

The trigger 2510 can be a push on-off locking switch. The trigger 2510 can be configured to power the LED 2504 and the circuit 2508 can be configured to control the LED 2504. Both the trigger 2510 and the circuit 2508 can be used to obtain the desired light effects of: timing, color, brightness, illumination, or a combination thereof.

The nightlight system 2500 can be turned on when the top housing 2512 is touched or pushed, which will activate the trigger 2510. Other contemplated embodiments include the trigger 2510 activating by manual manipulation of the trigger 2510 itself as a switch.

The power source can be in the form of an AC adapter, a solar power source, a wind power source, a chemical power source, a generator power source, or any direct current power source or/and DC current storage device which available from the market.

The optical components 2502 are shown as a laser processed film or injected piece in a cylindrical shape and designed to fit into the top housing 2512. The optical components 2502 can be situated a distance from the LED 2504.

It has been discovered that distance between the optical components 2502 and the LED 2504 is very important when manufacturing the optical components 2502 in the form of a laser processed film or injected piece. Once the distance is determined, a laser process film or injected piece is designed to provide a desired image including the number of images, the size of the images, and the configuration of the images.

The LED 2504 is shown installed on the circuit 2508, which can be a PCB. The height of the LED 2504 and the circuit 2508 can be adjusted with a height adjuster 2514. The height adjuster 2514 can couple the LED 2504 and the circuit 2508 with the base housing 2506 and adjust the distance therebetween.

The height adjuster 2514 can move the circuit 2508 from its currently shown position all the way touching the base housing 2506. The LED 2504 can emit light that will interact with the optical components 2502. The optical components 2502 extend between the side walls of the top housing 2512 and are between the top housing 2512 and the LED 2504.

The light from the LED 2504 will pass through the optical components 2502 and create images on the sidewalls of the top housing 2512. The height adjuster 2514 can be used to change the intensity of the light, the light pattern, or the diffusion of the light emitted from the LED 2504 to the optical components 2502. The height adjuster 2514 can be a nut and a bolt.

Figure 26:
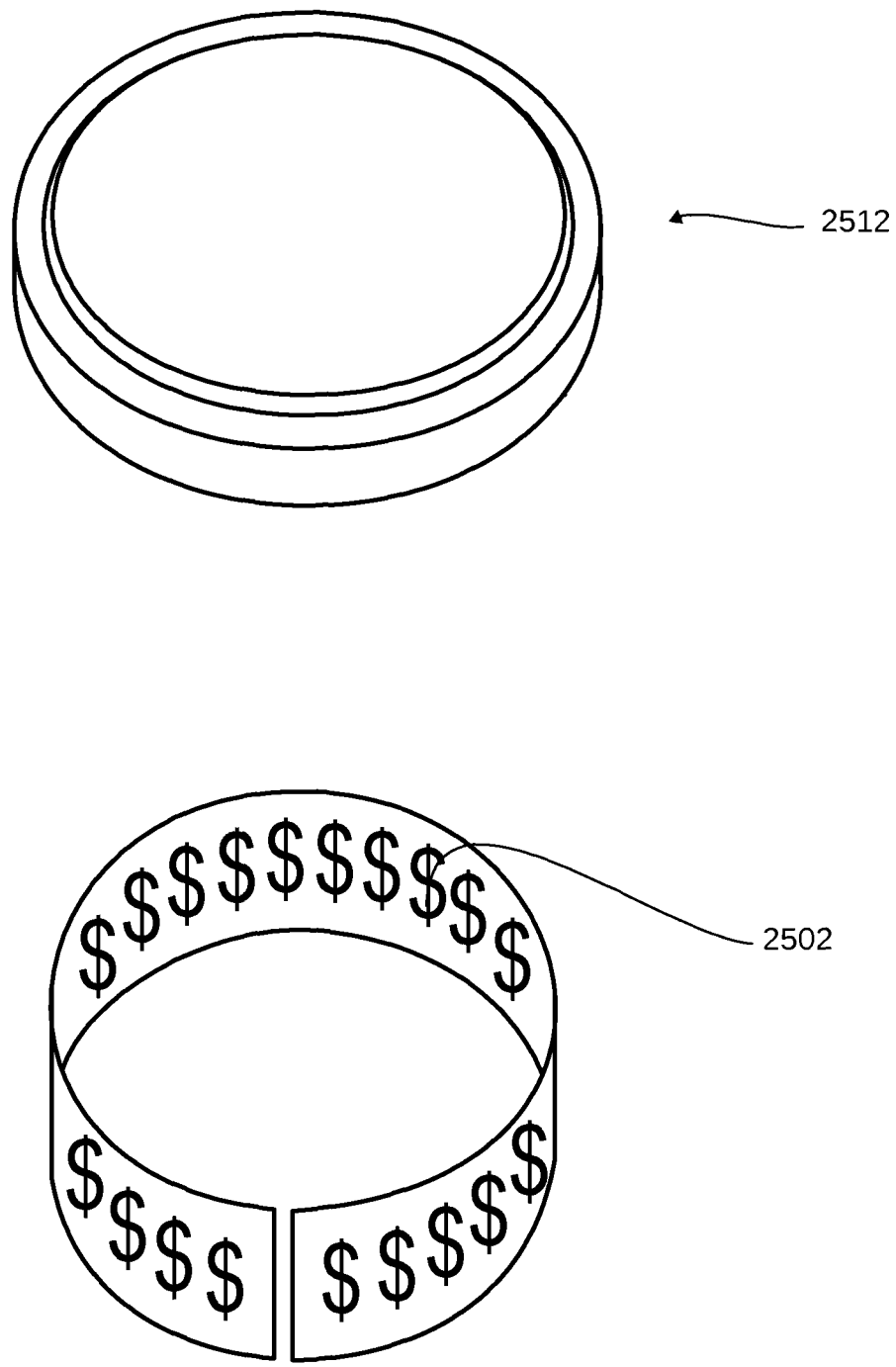
FIG. 26 is an exploded isometric view of the optical components and top housing of FIG. 25.

Referring now to FIG. 26, therein is shown an exploded isometric view of the optical components 2502 and the top housing 2512 of FIG. 25. The optical components 2502 is shown having dollar signs designed therein. The dollar signs on the optical components 2502 will be projected onto side walls of the top housing 2512.

Figure 27:
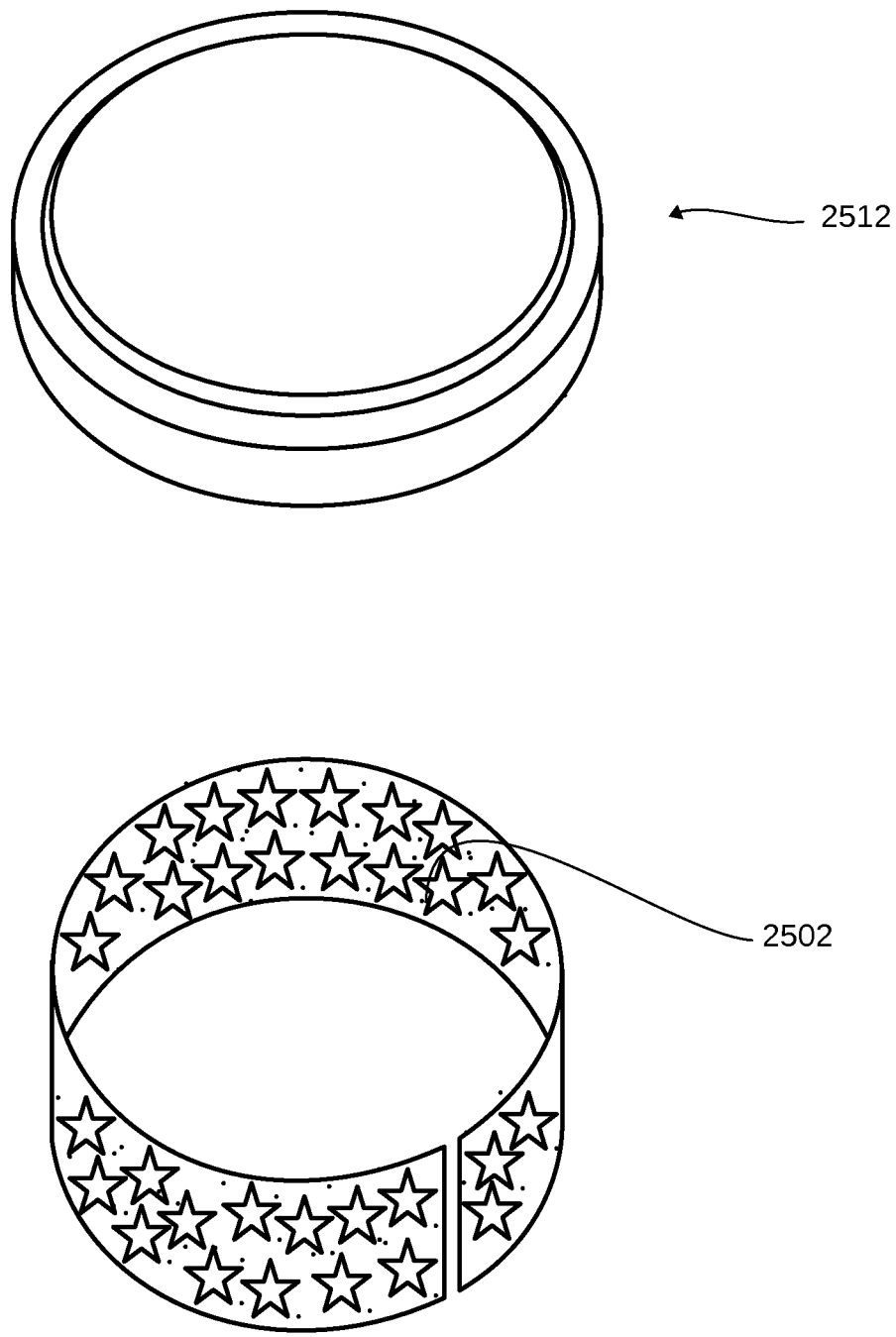
FIG. 27 is an exploded isometric view of the optical components and top housing of FIG. 25.

Referring now to FIG. 27, therein is shown an exploded isometric view of the optical components 2502 and the top housing 2512 of FIG. 25. The optical components 2502 is shown having stars designed therein. The stars on the optical components 2502 will be projected onto side walls of the top housing 2512.

Figure 28:
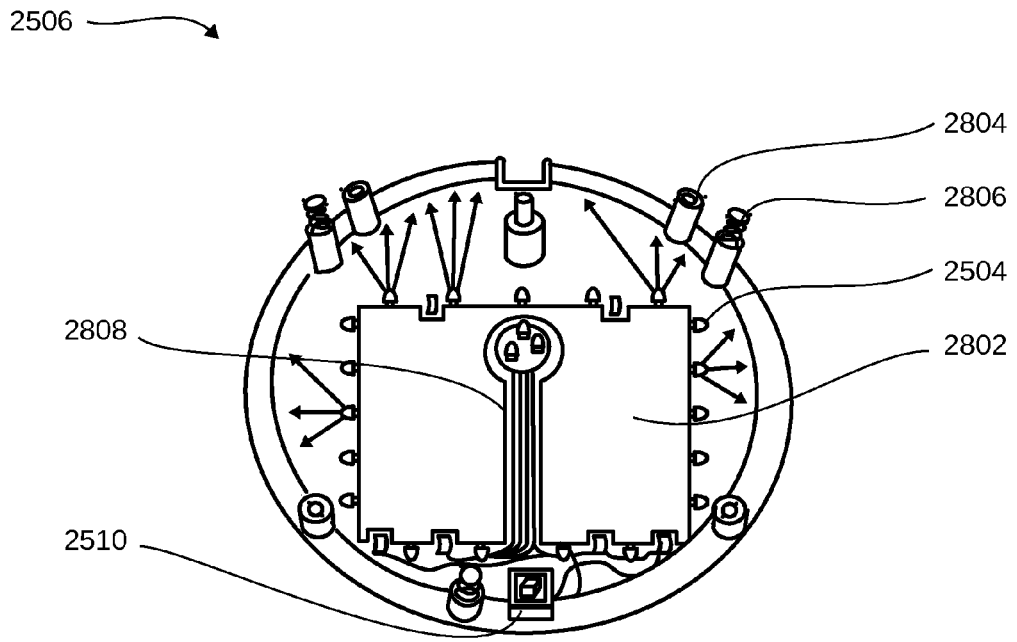
FIG. 28 is a top isometric view of a first optional base housing for the nightlight system of FIG. 25.

Referring now to FIG. 28, therein is shown a top isometric view of a first optional base housing 2506 for the nightlight system of FIG. 25. The base housing 2506 is contemplated to be used with the top housing 2512 and the optical components 2502 of FIGS. 25, 26, and 27 to produce a large image on the walls of the top housing 2512.

The base housing 2506 has a battery compartment 2802 and the trigger 2510. The base housing 2506 further includes assembly poles 2804 and spring members 2806. The spring members 2806 can bias one of the optical components 2502 on the top housing 2512 of FIG. 5, such as top lens, to an upward position so that pushing the top lens will turn the LEDs 2504 on and off.

The LEDs 2504 are positioned on the circuit 2508 and connected with the battery compartment 2802 by conductors 2808. The conductors 2808 can supply the electric signals that turn the LEDs 2504 on and off. The trigger 2510, the conductors 2808, and the circuit 2508 in combination can power and control the LEDs 2504 to obtain the pre-determined lighting effects of brightness and color. The LEDs 2504 also can be installed along the battery compartment edge.

Figure 29:
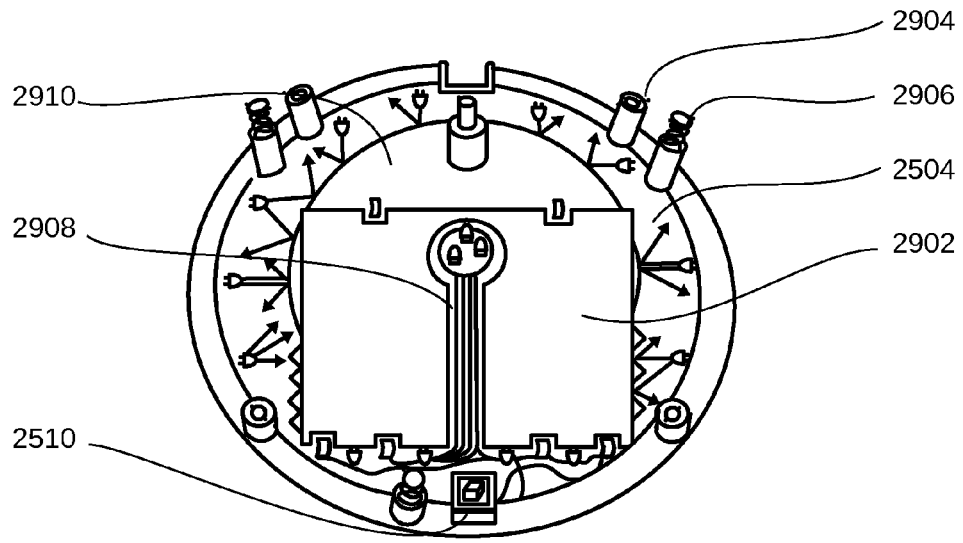
FIG. 29 is a top isometric view of a second optional base housing for the nightlight system of FIG. 25.

Referring now to FIG. 29, therein is shown a top isometric view of a second optional base housing 2506 for the nightlight system of FIG. 25. The base housing 2506 is contemplated to be used with the top housing 2512 and the optical components 2502 of FIGS. 25, 26, and 27 to produce a large image on the walls of the top housing 2510.

The base housing 2506 has a battery compartment 2902 and the trigger 2510. The base housing 2506 further includes assembly poles 2904 and spring members 2906. The spring members 2906 can bias one of the optical components 2502 on the top housing 2512 of FIG. 5, such as top lens, to an upward position so that pushing the top lens will turn the LEDs 2504 on and off.

The LEDs 2504 are positioned on the circuit 2508 and connected with the battery compartment 2902 by conductors 2908. The conductors 2908 can supply the electric signals that turn the LEDs 2504 on and off. The trigger 2510, the conductors 2908, and the circuit 2508 in combination can power and control the LEDs 2504 to obtain the pre-determined lighting effects of brightness and color.

The LEDs 2504 also can be installed along the battery compartment edge and emit light beams inwardly towards a circle reflector 2910. The circle reflector 2910 beneficially increases the number of light spots that can reflect to the optical components 2502.

Figure 30:
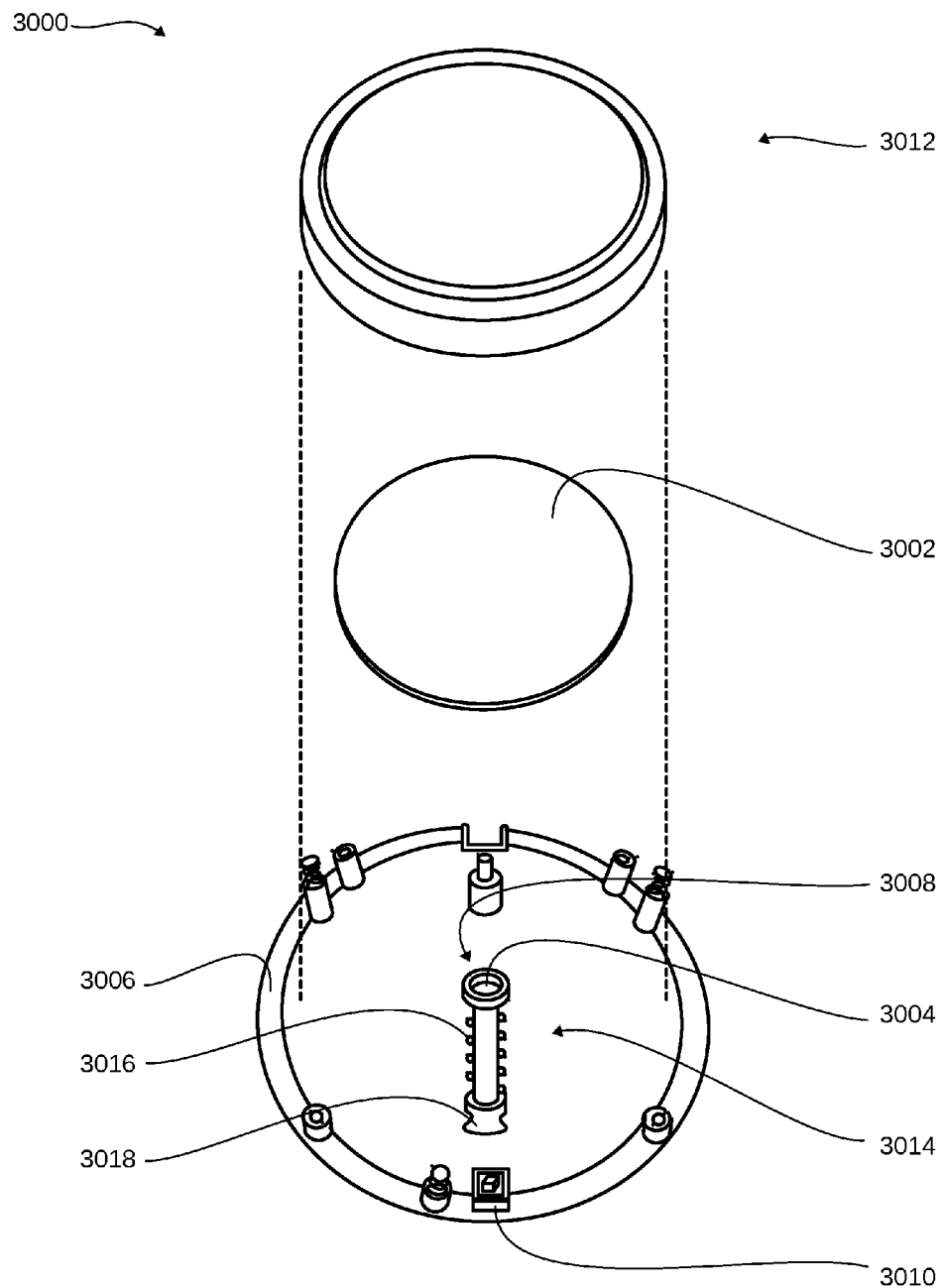
FIG. 30 is an exploded isometric view of the nightlight system in a fifteenth embodiment.

Referring now to FIG. 30, therein is shown an exploded isometric view of the nightlight system in a fifteenth embodiment. The nightlight system 3000 is shown having optical components 3002 and an LED 3004.

The LED 3004 serves as a light source to supply visible light beams. The optical components 3002 can be an optics-lens, a film, openings, cut-outs, laser-treated transparent material piece or translucent material piece, diffraction grating, holographic optical elements, or a combination thereof. The optical components 3002 can be used to create an image.

The image can be a message, data, logo, or time, and can be displayed or projected on a ceiling, walls, floor, other surface, on the optical components 3002, or a combination thereof. The nightlight system 3000 further includes a power source (not shown) under the base housing 3006, a circuit 3008, and a trigger 3010.

The trigger 3010 can be a push on-off locking switch. The trigger 3010 can be configured to power the LED 3004 and the circuit 3008 can be configured to control the LED 3004. Both the trigger 3010 and the circuit 3008 can be used to obtain the desired light effects of: timing, color, brightness, illumination, or a combination thereof.

The nightlight system 3000 can be turned on when the top housing 3012 is touched or pushed, which will activate the trigger 3010. Other contemplated embodiments include the trigger 3010 activating by manual manipulation of the trigger 3010 itself as a switch.

The power source can be in the form of an AC adapter, a solar power source, a wind power source, a chemical power source, a generator power source, or any direct current power source or/and DC current storage device which available from the market.

The optical components 3002 are shown as a laser processed film or injected piece in a horizontal lens shape and designed to fit horizontally into the top housing 3012. The optical components 3002 can be situated a distance from the LED 3004.

It has been discovered that distance between the optical components 3002 and the LED 3004 is very important when manufacturing the optical components 3002 in the form of a laser processed film or injected piece. Once the distance is determined, a laser process film or injected piece is designed to provide a desired image including the number of images, the size of the images, and the configuration of the images.

The LED 3004 is shown installed on the circuit 3008, which can be a PCB. The height of the LED 3004 and the circuit 3008 can be adjusted with a height adjuster 3014. The height adjuster 3014 can couple the LED 3004 and the circuit 3008 with the base housing 3008 and adjust the distance therebetween.

The height adjuster 3014 can move the circuit 3008 from its currently shown position all the way touching the base housing 3008. The LED 3004 can emit light that will interact with the optical components 3002. The optical components 3002 extend horizontally between the side walls of the top housing 3004 and are between a top portion of the top housing 3004 and the LED 3004.

The light from the LED 3004 will pass through the optical components 3002 and create images on the top portion of the top housing 3004. The height adjuster 3014 can be used to change the intensity, light pattern, or diffusion of the light emitted from the LED 3004 to the optical components 3002.

The height adjuster 3014 can include detents 3016 and a receiving hole 3018 to hold the position of the circuit 3008 and the LED 3004 at a certain height above the base housing 3008. The distance between the optical components 3002 and the LED 3004 can be adjusted to change the lighting effects of the image displayed on the top housing 3004.

Figure 31:
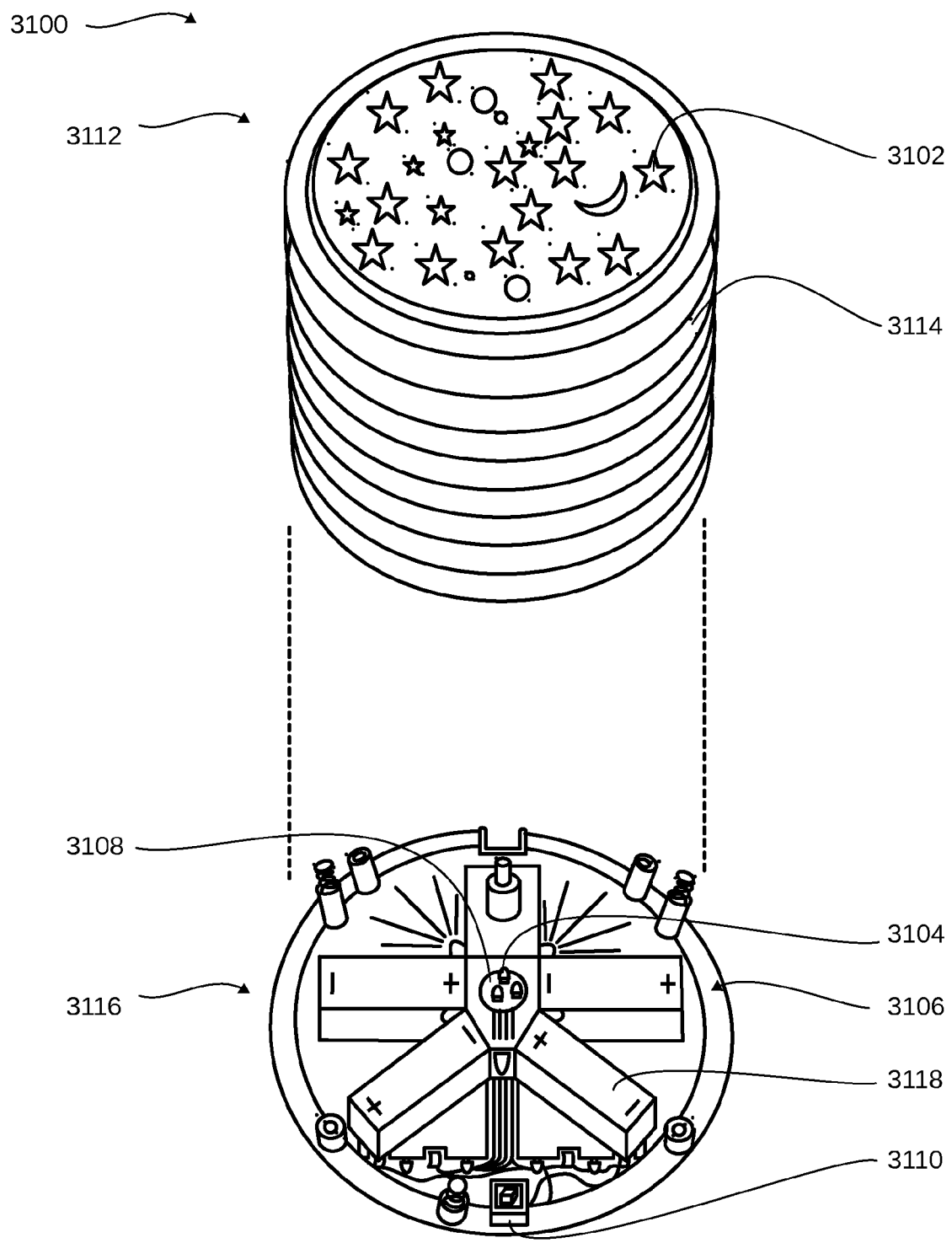
FIG. 31 is an exploded isometric view of the nightlight system in a sixteenth embodiment.

Referring now to FIG. 31, therein is shown an exploded isometric view of the nightlight system 3100 in a sixteenth embodiment. The nightlight system 3100 is shown having optical components 3102 including pinhole projectors.

The optical components 3102 can project an image with light from a light source including LEDs 3104. It is contemplated that the optical components 3102 can be pinhole projectors, a film that can be printed with colorful art, openings like stars and planets, windows of translucent or transparent material, or a combination thereof.

The optical components 3102 are further contemplated to include laser treated or laser processed optical components like: diffraction grating, and holographic optical elements, or a combination there of. The optical components 3102 can be used to create a desired image, message, data, logo, or time on a ceiling, walls, floor, desired surface, or on the surface of the optical components 3102.

The LEDs 3104 are powered by a power source 3106 and controlled with a circuit 3108 and a trigger 3110. The power source 3106, the circuit 3108, and the trigger 3110 are arranged to power and control the LEDs 3104.

The LEDs 3104 can be controlled and powered to obtain the desired light effects such as: timing, color, brightness, illumination, and/or light effects. The power source 3106 is a DC power source, which can be turned on when a top housing 3112 has been touched or pushed. Specifically it is contemplated that pressing the top housing 3112 can impact or move the trigger 3110 powering the circuit 3108, which would then control the LEDs 3104. It is contemplated that the trigger 3110 could be a pressure sensitive switch that would respond to a touch or press of the top housing 3112.

Other contemplated configurations of the power source 3106 include an AC power source having an adapter, a solar power source, a wind power source, a chemical power source, a generator power source, or a combination thereof.

The optical components 3102 of the nightlight system 3100 are depicted as pinhole projectors with stars, a moon, and planets. The top housing 3112 has a foldable skirt 3114, which can adjust the height of the top housing 3112.

Adjusting the height of the top housing 3112 in relation to a base housing 3116 can change the distance between the optical components 3102 and the LEDs 3104. It is contemplated a different form of height adjuster, such as those discussed above, could be used to change the distance between the optical components 3102 and the LEDs 3104.

The power source 3106 could be an arrangement of battery cells 3118 could be in a star pattern radiating out from a center of the base housing 3116. This arrangement of the battery cells 3118 enables the battery cells 3118 to be installed as close to center as possible to increase the distance between the LEDs 3104 and the optical components 3102.

For the present optical components 3102 depicted as the pinhole projectors, it has been discovered that installing the battery cells 3118 on the edge of the base housing 3116 can lower the height of the LEDs 3104 allowing the light to be emitted from the LEDs 3104 further from the optical components 3102 projecting a more desirable image.

The LEDs 3104 are depicted as arranged very close to a center position of the base housing 3116 so that the light beams of the LEDs 3104 will spread out to inner walls of the foldable skirt 3114, the top housing 3112, and the optical components 3102. It has been discovered that if the LEDs 3104 are too close to the top housing 3112 or to the optical components 3102, then the lighting effects will be limited and manufacturing through laser tooling the optical components 3102 will be more complex and costly.

It has been discovered that an optimal distance between the LEDs 3104 and the optical components 3102 with the pinhole projectors or film in the present embodiment is two to ten centimeters. This reduces production costs and costs of tooling and enables readily available products.

It is contemplated that the battery cells 3118 could be arranged in a different position, location, orientation, or a combination thereof to allow the lower height of the LEDs 3104. It is further depicted that the LEDs 3104 can be arranged on and in between the battery cells 3118 and pointing out toward the top housing 3112.

The night light of the current invention may have a spiral or star arrangement for the batteries which means all higher height batteries are installed on an edge or contour of the light emitting from the LEDs 3104 so that the LEDs 3104 may be put on or near center locations of the base housing 3116 and emit light toward the top housing 3112 and the optical components 3102 without the battery cells 3118 blocking the light from the LEDs 3104.

Figure 32:
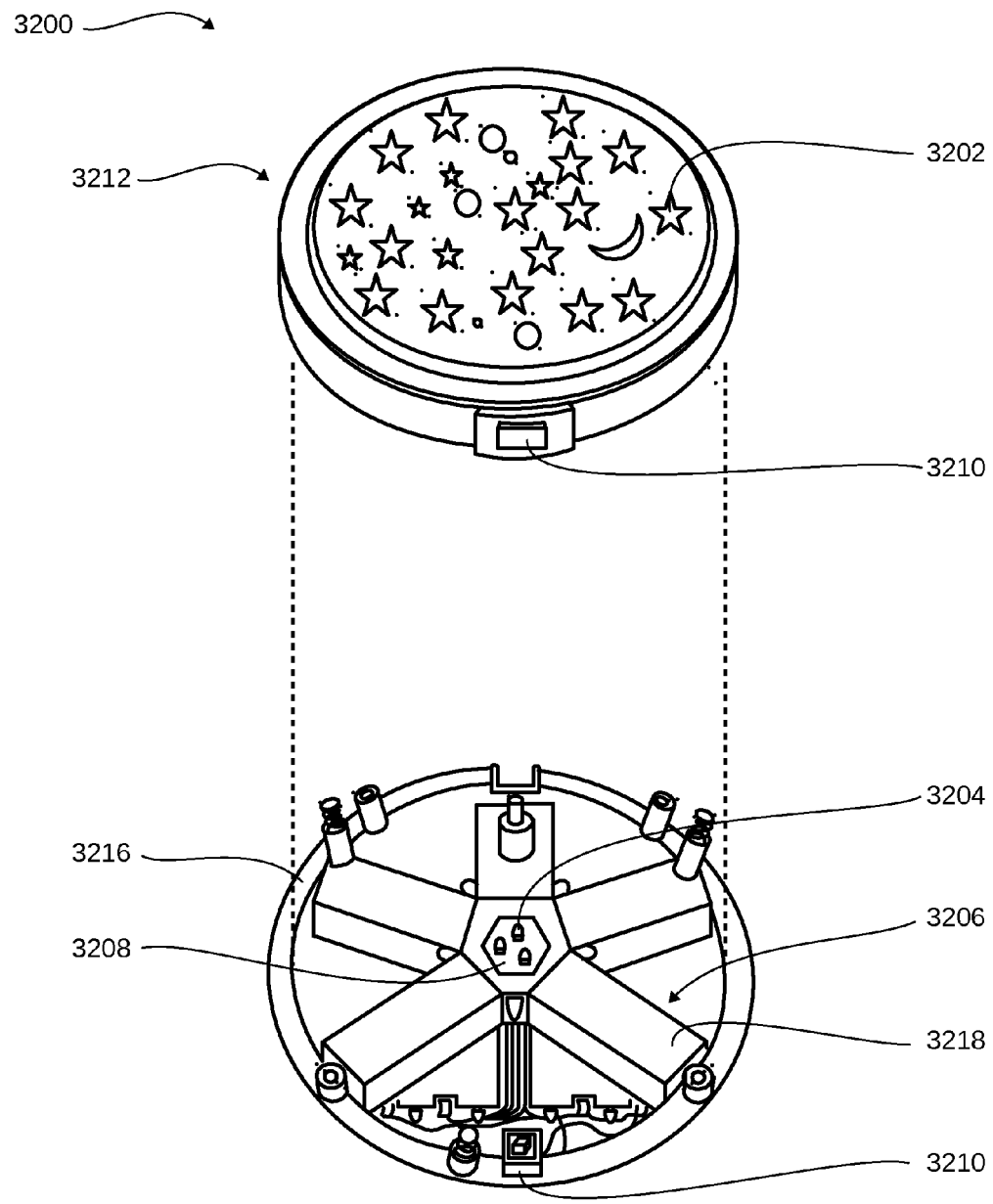
FIG. 32 is an exploded isometric view of the nightlight system in a seventeenth embodiment.

Referring now to FIG. 32, therein is shown an exploded isometric view of the nightlight system 3200 in a seventeenth embodiment. The nightlight system 3200 is shown having optical components 3202 including pinhole projectors.

The optical components 3202 can project an image with light from a light source including LEDs 3204. It is contemplated that the optical components 3202 can be pinhole projectors, a film that can be printed with colorful art, openings like stars and planets, windows of translucent or transparent material, or a combination thereof.

The optical components 3202 are further contemplated to include laser treated or laser processed optical components like: diffraction grating, and holographic optical elements, or a combination there of. The optical components 3202 can be used to create a desired image, message, data, logo, or time on a ceiling, walls, floor, desired surface, or on the surface of the optical components 3202.

The LEDs 3204 are powered by a power source 3206 and controlled with a circuit 3208 and a trigger 3210. The power source 3206, the circuit 3208, and the trigger 3210 are arranged to power and control the LEDs 3204.

The LEDs 3204 can be controlled and powered to obtain the desired light effects such as: timing, color, brightness, illumination, and/or light effects. The power source 3206 is a DC power source, which can be turned on when a top housing 3212 has been touched or pushed. Specifically it is contemplated that pressing the top housing 3212 can impact or move the trigger 3210 powering the circuit 3208, which would then control the LEDs 3204.

It is contemplated that the trigger 3210 could be a pressure sensitive switch that would respond to a touch or press of the top housing 3212. It is further shown that the trigger 3210 can be manually manipulated from the top housing 3212.

Other contemplated configurations of the power source 3206 include an AC power source having an adapter, a solar power source, a wind power source, a chemical power source, a generator power source, or a combination thereof.

The optical components 3202 of the nightlight system 3200 are depicted as pinhole projectors with stars, a moon, and planets. The distance between the LEDs 3204 and the optical components 3202 can be adjusted with a height adjuster (not shown) at the base of the LEDs 3204. Adjusting the height of the LEDs 3204 in relation to the top housing 3212 can change the distance between the optical components 3202 and the LEDs 3204.

The power source 3206 could be an arrangement of battery cells 3218 could be in a star pattern radiating out from a center of a base housing 3216. This arrangement of the battery cells 3218 enables the battery cells 3218 to be installed as close to center as possible to increase the distance between the LEDs 3204 and the optical components 3202.

For the present optical components 3202 depicted as the pinhole projectors, it has been discovered that installing the battery cells 3218 on the edge of the base housing 3216 can lower the height of the LEDs 3204 allowing the light to be emitted from the LEDs 3204 further from the optical components 3202 projecting a more desirable image.

The LEDs 3204 are depicted as arranged very close to a center position of the base housing 3216 so that the light beams of the LEDs 3204 will spread out to inner walls of the foldable skirt 3214, the top housing 3212, and the optical components 3202. It has been discovered that if the LEDs 3204 are too close to the top housing 3212 or to the optical components 3202, then the lighting effects will be limited and manufacturing through laser tooling the optical components 3202 will be more complex and costly.

It has been discovered that an optimal distance between the LEDs 3204 and the optical components 3202 with the pinhole projectors or film in the present embodiment is two to ten centimeters. This reduces production costs and costs of tooling and enables readily available products.

It is contemplated that the battery cells 3218 could be arranged in a different position, location, orientation, or a combination thereof to allow the lower height of the LEDs 3204. It is further depicted that the LEDs 3204 can be arranged on and in between the battery cells 3218 and pointing out toward the top housing 3212.

The night light of the current invention may have a spiral or star arrangement for the batteries which means all higher height batteries are installed on an edge or contour of the light emitting from the LEDs 3204 so that the LEDs 3204 may be put on or near center locations of the base housing 3216 and emit light toward the top housing 3212 and the optical components 3202 without the battery cells 3218 blocking the light from the LEDs 3204.

Thus, it has been discovered that the nightlight system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the nightlight system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:
1. A light emitting diode night light system comprising:
 a tube housing;

a light emitting diode positioned at one end of the tube housing, the light emitting diode for providing a visible light beam;

a lens positioned at a different end of the tube housing from the light emitting diode;

an optical component positioned within the tube housing, the optical component positioned between the light emitting diode and the lens, and the optical component arranged perpendicularly to the visible light beam and configured to create an image from the visible light beam; and an outer housing around the tube housing configured to rotate and change an orientation of the tube housing, and wherein the outer housing is a sphere, a ball, or a half ball.

2. The system of claim 1 wherein the optical component is configured to be changeable.

3. The system of claim 2 wherein the optical component is on a rotatable disc and configured to be changed by rotating a disc.

4. The system of claim 1 wherein the optical component is a slide, a film, an opening, a cut-out, a transparent material piece, translucent material piece, a diffraction grating, or a holographic optical element.

5. The system of claim 1 wherein the image is a message, data, a logo, or a time.

6. The system of claim 1 wherein the optical component, lens, and light emitting diode are configured to project the image onto a ceiling, wall, or floor.

7. The system of claim 1 wherein the optical component, lens, and light emitting diode are configured to project the image multiple times larger than the image on the optical component.

8. The system of claim 1 further comprising a circuit and trigger coupled to the light emitting diode and configured to control timing, color, brightness, illumination, or a combination thereof for the light emitting diode.

9. The system of claim 6 wherein the circuit is configured to control fade-in, fade-out, automatic color changing, sequential or random on and off, chasing, pair flashing, time delay, time period selection, steady on, turn on or off in response to a photo or motion sensor, brightness changing, rotating effects the timing, color, brightness, illumination, or a combination thereof for the light emitting diode.

10. The system of claim 1 wherein the circuit is a circuit board, an integrated circuit, or a combination thereof.

11. The system of claim 1 wherein the optical component includes the image formed on the optical component.

12. The system of claim 1 wherein the power source is an alternating current power source, or a direct current source.

13. The system of claim 1 wherein the image is a color image.

14. The system of claim 1, wherein the optical components is configured to have the light beams pass through the optical components and produce the image.

15. The system of claim 1 further comprising a power source coupled to the light emitting diode and the power source is an alternating current power source or a direct current power source.

16. The system of claim 15 wherein the direct current power source is a battery.

* * * * *

UNITED STATES PATENT AND TRADEMARK OFFICE
CERTIFICATE OF CORRECTION

| | | |
|---|---|---|
| PATENT NO. | : 9,097,413 B2 | Page 1 of 1 |
| APPLICATION NO. | : 14/622628 | |
| DATED | : August 4, 2015 | |
| INVENTOR(S) | : Tseng-Lu Chien | |

It is certified that error appears in the above-identified patent and that said Letters Patent is hereby corrected as shown below:

In the Claims:

Column 20, line 21, claim 14, delete the "," between "claim 1" and "wherein"

Signed and Sealed this
Twelfth Day of January, 2016

Michelle K. Lee
*Director of the United States Patent and Trademark Office*